(12) United States Patent
Harrell et al.

(10) Patent No.: US 6,263,355 B1
(45) Date of Patent: *Jul. 17, 2001

(54) NON-LINEAR MODEL PREDICTIVE CONTROL METHOD FOR CONTROLLING A GAS-PHASE REACTOR INCLUDING A RAPID NOISE FILTER AND METHOD THEREFOR

(75) Inventors: Douglas G. Harrell, Newark; Dennis C. Williams, Wilmington, both of DE (US)

(73) Assignee: Montell North America, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/588,623

(22) Filed: Jun. 7, 2000

Related U.S. Application Data

(62) Division of application No. 08/996,853, filed on Dec. 23, 1997, now Pat. No. 6,122,557.

(51) Int. Cl.[7] ................................................. G06F 17/10
(52) U.S. Cl. ........................................................... 708/320
(58) Field of Search ..................................... 708/320, 300

(56) References Cited

U.S. PATENT DOCUMENTS

| | | | |
|---|---|---|---|
| 4,634,946 | 1/1987 | Moulds, III et al. | 315/561 |
| 4,928,484 | 5/1990 | Peczkowski | 60/240 |
| 4,956,426 | 9/1990 | Ardell et al. | 526/60 |
| 5,015,954 | 5/1991 | Dechene et al. | 324/307 |
| 5,049,819 | 9/1991 | Dechene et al. | 324/307 |
| 5,301,101 | 4/1994 | MacArthur et al. | 700/36 |
| 5,329,443 | 7/1994 | Bonaquist et al. | 700/33 |
| 5,424,942 | 6/1995 | Doug et al. | 700/44 |
| 5,519,605 | 5/1996 | Cawlfield | 700/31 |
| 5,568,378 | 10/1996 | Wojsznis | 700/44 |
| 5,609,139 | 3/1997 | Ueda et al. | 123/492 |
| 5,640,491 | 6/1997 | Bhat et al. | 706/25 |
| 5,649,063 | 7/1997 | Bose | 706/23 |
| 5,659,667 | 8/1997 | Buescher et al. | 706/23 |
| 5,669,354 | 9/1997 | Morris | 123/406.24 |
| 5,818,741 | * 10/1998 | Boie et al. | 708/320 |
| 5,999,955 | * 12/1999 | Davis, Jr. et al. | 708/320 |
| 6,009,445 | * 12/1999 | Tsyryanovich | 708/320 |

FOREIGN PATENT DOCUMENTS

| | | |
|---|---|---|
| 0138609 B1 | 2/1994 | (EP) . |
| WO 93/25953 | 12/1993 | (WO) . |
| WO 96/41822 | 12/1996 | (WO) . |
| WO 97/42553 | 11/1997 | (WO) . |

OTHER PUBLICATIONS

On the use of extensive Variables in Process –Dynamics and Control (Chem Eng. Sci., vol. 41 pp. 1471–1484 (1986).
Polyolefins X –Int'l Conference, Feb. 23–26, 1997, "Intrinsically Safe Supervisory Control of Non–linear Model Prediative Controllers", Douglas C. Hirrell.

* cited by examiner

Primary Examiner—David H. Malzahn
(74) Attorney, Agent, or Firm—Westerlund Powell, P.C.; Raymond H. J. Powell, Jr.; Robert A. Westerlund

(57) ABSTRACT

A method for controlling a chemical reactor such as a gas-phase reactor using a non-linear predictive control includes steps for generating a plurality of signals representing a current state of the chemical reactor and reflecting a respective constituent of reactants in the chemical reactor, calculating a future state of the chemical reactor responsive to said plurality of signals and referenced to mass hold-up of the reactants in the chemical reactor, and controlling at least one parameter related to the chemical reactor so as to control the future state of the chemical reactor. Spurious control events due to noise in sensor or controller output signals are preferably minimized by filtering these signals using a N-sign filter subroutine.

9 Claims, 29 Drawing Sheets

| Measurement | Response | Manipulated Variable | Response |
| --- | --- | --- | --- |
| Pressure | Fast | Level | Slow |
| Gas Ratio | Slow | C3 - Feed | Fast |
| % C2 - | Slow | C2 - Feed | Fast |

| Measurement | Response | Manipulated Variable | Response |
|---|---|---|---|
| Pressure, Gas Ratio | Fast, Slow | C3 -, C2 - ( overshoot ) | Fast |
| % C2 - | Slow | C2 - ( steady state ) | Slow |
| Pressure | Fast | Level | Slow |

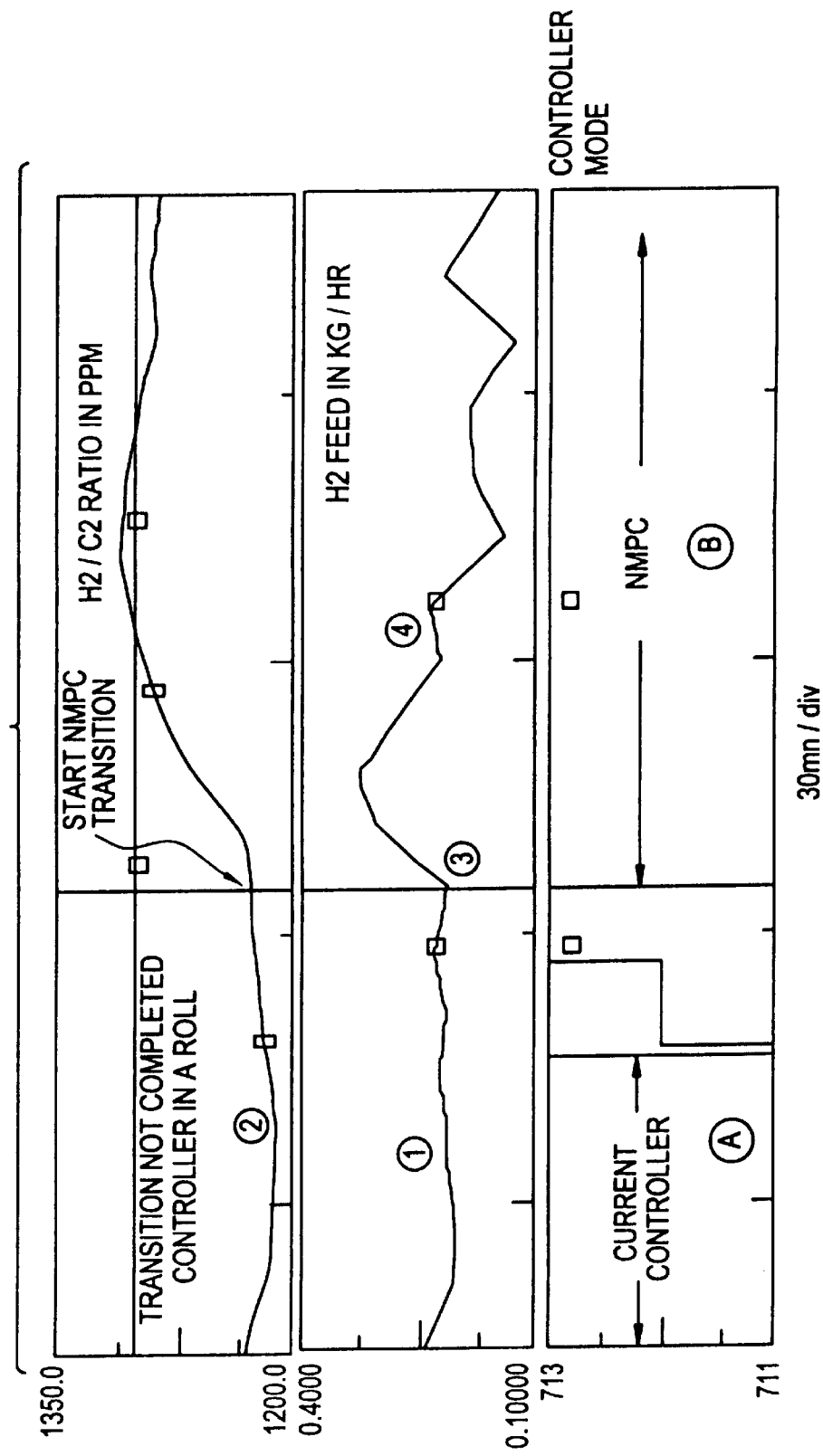

- ● signal
- ◯ low - pass filter
- ◯ 3 sign filter

NON-LINEAR MODEL PREDICTIVE CONTROL METHOD FOR CONTROLLING A GAS-PHASE REACTOR INCLUDING A RAPID NOISE FILTER AND METHOD THEREFOR

This is a division of application Ser. No. 08/996,853, which was filed on Dec. 23, 1997, now U.S. Pat. No. 6,122,557.

BACKGROUND OF THE INVENTION

1. Field of the Invention

The present invention relates generally to a control method of a chemical process such as that used in a chemical reactor. More specifically, the present invention relates to a method for controlling a chemical reactor using a feedforward subroutine for calculating parametric balances responsive to multivariable inputs which takes advantage of system knowledge and a rapid noise filtering subroutine. The present invention is particularly applicable to real time automatic control systems and apparatus and more specifically to a class of controllers utilizing dynamic system prediction techniques employing on-line parametric balances and non-linear modeling. A filter and corresponding filtering method are also disclosed.

2. Brief Discussion of Related Art

In the control art, traditional or classic feedback controllers dominate control practice. Traditional feedback controllers include linear controllers, such as the proportional (P) controller, the proportional-integral (PI) controller, or the proportional-integral-derivative (PID) controller, all of which are discussed below, and non-linear controllers, such as the fuzzy logic (FL) controller. A high level partially block, partially schematic diagram of a hypothetical chemical reactor utilizing P-type feedback control is shown in FIG. 1, which illustrates a process whereby the liquid level in a conical tank 10 is being maintained by controlling the feed rate Vf of the influent liquid. More specifically, a level controller 12 provides signals indicative of the level in tank 10 to a flow controller FC 14, which senses the liquid feed Vf and provides positioning signals to feed control valve 16 to control the liquid feed Vf to the tank 10. It will be noted that, in the system depicted in FIG. 1, the liquid out of the tank is not controlled by the flow controller 14.

It will be appreciated that when the level in the conical tank is above its set-point SP, the controller 14 will reduce the fresh feed to the tank, i.e., decrease Vf, and when it's too low, the controller 14 will increase the flow, i.e., increase Vf. The magnitude of this adjustment is determined by the tuning parameters used, the most important of which is the gain, i.e., the proportional term ("P") in PID. In this case, the gain would be specified is units of (liters/hr)/(% level). By specifying the gain, the operator specifies how much the liquid feed Vf will be adjusted for a change in the percentage (%) deviation of the level in tank 10 from the predetermined set-point SP.

It should also be noted that the other two terms denoted by the term PID are the integral term and the derivative term. The integral term, as its name implies, keeps track of how long the level has been away from the predetermined set-point SP. As the area between the set-point curve and the present valve curve increases, the integral term (I) begins commanding larger changes to the liquid feed Vf. In contrast, the derivative term (D) specifies the adjustment amount for the liquid feed Vf when the level of tank 10 is accelerating or decelerating, e.g., the change in Vf would be a first value when the level of tank 10 is increasing at an increasing rate and a second value different from the first value when the level of tank 10 is increasing at a decreasing rate.

PID is a conventional control strategy that has been around since the 1930's; PID control is still predominant in the chemical manufacturing industry. It will be appreciated that PID control has several advantages, the greatest of which is that it does not require any special knowledge or models of the system; PID control merely requires that the operator have a deft hand at tuning the system. This strength is also its biggest weakness. More specifically, PID control doesn't take advantage of what the operator does know about the system. Thus, for the hypothetical control system illustrated in FIG. 1, the system does not take into account the fact that the tank 10 is conical. As shown in FIG. 1, the conical tank 10 is draining under gravity with the level controller 14 adjusting the flow rate of fresh feed, Vf. Because the tank 10 is conical, the change in the hold-up required to change the level is much greater when the level is high. Intuitively, this presents a problem in that a much larger adjustment to the flow Vf will be required to rectify a level deviation of 1% when the tank 10 is nearly full than when it is nearly empty. For this reason, any single set of tuning parameters for the FC controller 14 will not work for all values of the level set-point SP. Thus, it is generally not be possible to use a single set of tuning parameters for all levels of the tank 10. Therefore, the larger "transitions" from one level to another are principally done manually by the operator since one set of parameters will not work for both the low and high levels of tank 10.

The situation illustrated in FIG. 1 is further complicated if the control system has other control loops operating with respect to the tank 10, i.e., a temperature loop as shown in FIG. 2. In FIG. 2, the temperature 10 is preferably being controlled by adjusting the temperature Tj of the jacket fluid Vj. More specifically, a temperature sensor 18 provides a temperature signal to a temperature controller 20 controlling a heater 22, which heater heats the fluid Vj provided to the jacket 10' of tank 10. To control the tank temperature to 70° C., the temperature controller 20 changes the set-point on the jacket fluid temperature, Tj. It should be noted that controller 14 and 20, although physically isolated from one another, are nonetheless operatively coupled to one another. To help demonstrate the concept of "controller coupling" on this system, assume that the fresh liquid is being fed to tank 10 at 20° C. and assume that the tank fluid density is a function of temperature. Therefore, any change in the feed Vf will affect the temperature of the fluid in tank 10, which will affect the density of the fluid in tank 10, which will subsequently affect the level in tank 10, and so on. As shown in FIGS. 3 and 4, instability can result, as discussed in greater detail below. The relational diagram of FIG. 4 further illustrates controller coupling due to the strong coupling of the level and temperature controllers that occurs through the density of the liquid in the tank 10.

It will be appreciated that the amount of heat transferred to the tank 10 will depend on the temperature difference $(T_{jacket} - T_{tank})$ and the surface area of contact, i.e., the heat exchange surface area. Moreover, the temperature rise in the tank 10 depends on the mass of liquid in the tank and the heat capacity of the liquid. It will be noted that both the surface area for heat exchange and the liquid mass are strong, non-linear functions of tank level; it follows, just by inspection, that any disturbance in or change to the level in tank 10 will upset the temperature of the liquid in tank 10.

Furthermore, assuming that the liquid density is a function of temperature, any change in the temperature of tank 10 will affect the level of liquid in tank 10, which will, in turn, affect the fresh liquid feed Vf, which will further upset the temperature in tank 10. In conventional PID control, this is what is known as controller coupling leading to either sustained oscillations in the system or outright instability of the system. This is shown in FIGS. 3 and 4 for a change of level set-point SP. From these latter Figures, it will be appreciated that while the tuning of controller 14 was acceptable for higher levels of tank 10, the much faster response of the system at lower levels of tank 10 caused severe system instability. The solution to controller coupling for systems with PID control such as illustrated in FIG. 2 is to "detune" one of the controllers 14, 20, i.e., to reduce the ability of controller 20, for example, to control its variable in the interest of keeping the other controllers such as controller 12 from fighting with controller 20. Thus, system stability comes at the price of more drift in addition to a poorer response to a process upset.

FIG. 5 is a generalized schematic diagram of a first gas-phase reactor (GPR) 100 for olefin polymerization products. Polymer is fed to the reactor 100 from the flash drum 110. Gas leaving the top of the reactor 100 is cooled in cooler 114 and recompressed by compressor 140. It will be noted that fresh monomers C2, C3 and hydrogen H2 are then added and the gas is fed back into the GPR 100. Gas also leaves the reactor 100 through the fines cyclone 128 and the polymer discharge valves 130, 132. Gas exiting the discharge valve 130, 132 eventually reaches the ethylene stripper 116, via a teal scrubber 120 and compressor 118, where much of the propylene and propane are removed and returned to the propylene bullet (not shown), while the ethylene and hydrogen H2 are returned to the reactor 100.

FIG. 6 shows the original gas-phase reactor control scheme superimposed on the schematic diagram of FIG. 5. It will be appreciated from inspection of FIG. 6 that the lead control loop uses the calculated value for the homopolymer discharge rate from the flash drum 100 to set the ethylene flow to reactor 100 required to achieve the desired % ethylene in the final product.

In order for the bipolymer produced in GPR 100 to have the right composition of ethylene and propylene, the gas composition must be maintained at the right value. Since the ethylene feed has already been fixed, this is accomplished by adjusting the propylene feed rate according to the reading of the gas controller GC. In particular, hydrogen H2 is controlled to maintain the desired ratio with ethylene. It will be appreciated that the pressure in GPR 100 must be maintained within a prescribed tolerance. Since the ethylene feed is fixed, and since the propylene feed must be adjusted to keep the gas composition on target, the needed control can only be accomplished by adjusting the level of the polymer bed in the reactor 100. It should be noted that the higher the bed level, the more catalyst is provided to the system to react the gas, and vice-versa.

At the bottom of FIG. 6 is a legend listing the measurements taken using system sensors and the variables which are controlled based on these measurements. It will be appreciated that the conventional control scheme, i.e., PID control, produces a basic mismatch in terms of sensing speed and speed of response. It will be noted that the control loop is able to follow changes in the pressure very quickly, yet the pressure is controlled by changing the bed level which changes very slowly. In addition, while the system is able to change the flow rates of the monomers very quickly, the system does not do so because the values for the gas composition change very slowly, and because the homopolymer feed is based on a filtered number.

A block diagram representing the conventional PID control strategy is shown in FIG. 7. As with the conical tank example discussed above, each PID controller in FIG. 7 is self-contained and unable to share information with the others. Another similarity is that these controllers are all "coupled" to the system, as discussed above, which means that they must be tuned to respond slowly to avoid instability. The best example of this is the hydrogen controller 70, which tries to maintain the H2/C2 ratio in the reactor by adjusting the hydrogen feed. However, changes to the C2 feed also affect this ratio. When an upset to either the gas ratio C2/C2+C3)) or the pressure (total gas) occurs, the C2 hold-up will change causing the hydrogen controller 70 to react in an attempt to maintain the ratio H2/C2. However, when the C2 excursion is over, the H2/C2 ratio will be out high on the opposite side, primarily due to the change in the H2 hold-up. It will be appreciated that the hydrogen controller 70, due to the slow tuning required for stability, will require many hours to eliminate the postulated disturbance.

In summary, the conventional control of the gas-phase reactor uses traditional PID controllers with no knowledge of the system controlled or the predictable interactions between the monitored and controlled variables. Because of this, PID control system loops must be tuned to react slowly to thereby minimize the effect of controller coupling. The selection of the ethylene feed as the lead controller, to which changes are allowed only very slowly, is necessary since any disturbance in the ethylene feed will upset all of the other PID controllers regulating the system.

Moreover, traditional feedback controllers do not perform well with processes dominated by dead time and processes having time-variant dynamics. In addition, traditional feedback controllers such as PID controllers do not perform well with multivariable processes, where interactions exist between the process variables. Several predictive control techniques have been developed to address the limitations of traditional feedback controllers, but none of these techniques has displaced the traditional feedback controller from its dominant position in the chemical industry.

It should be noted that the use of linear programming models to implement the control of a process is now conventional. Linear programming models, which mathematically define the relationship between the future changes of controlled variables and current and past changes in manipulated variables, are presently in use to enhance the operation of a process controller. In this context, it should be mentioned that a controlled variable is a process variable that is targeted to be maintained at a desired setpoint whereas a manipulated variable is a variable which is adjusted to drive the controlled variable to the target value. In any commercial process disturbances will occur external to the process which may cause instability, decrease efficiency and change product quality unless the process is controlled to respond in real time to the unmeasured disturbances. An unmeasured disturbance to the process may arise e.g., from an ambient temperature change, from a change in product formulation, or from an unexpected change in demand for products. In addition, such a process has system constraints such as temperature, pressure and flow rate which place limits on the process variables and must also be accounted for during control of the process.

Existing adaptive control methods such as employed in the adaptive Pole Placement controller and the Minimum Variance controller are promising approaches to accomplish needed control tasks. However, they suffer from two potentially crippling limitations: (1) computational complexity, which limits their feasibility in multivariable applications;

and (2) sensitivity to the choice of the input-output delays and model order selection. There has been considerable research recently in the development of adaptive controllers that attempt to overcome these limitations. A major focus has been the development of extended horizon predictive control methods. U.S. Pat. Nos. 5,301,101, 5,329,443, 5,424,942 and 5,568,378, which patents are incorporated herein by reference for all purposes, disclose various forms of horizon controllers and corresponding methods. The summary presented below summarizes the material from the background sections of several of the above captioned patents.

Dynamic matrix control (DMC) is a process control methodology using process models to compute adjustments in manipulated variables based on a prediction of future changes in controlled variables. The basic concept of dynamic matrix control is to use known time domain step response process models to determine changes in manipulated variables which minimize or maximize a performance index over a specified time horizon. A time sequence of manipulated variable changes for each manipulated variable is computed based on the response of the process predicted by the time domain step response models such that the performance index is optimized. It will be appreciated that the DMC controller by Cutler and Ramaker is based on an approximated step response model. Therefore, the DMC controller can be only applied to open loop stable systems.

High performance, computationally efficient real-time dynamic controller software and hardware are required for use in complex multi-input, multi-output, nonlinear, time-varying systems that are operating in challenging environments. In particular, there is a need for efficient control methods for dynamic systems having large numbers of system inputs and outputs, which overcome modeling uncertainties and unmeasurable external perturbations to the controlled systems.

The simplest predictive control methods, such as the Minimum Variance and the Generalized Minimum Variance methods, take into account the fact that the dynamic system has an input-output delay D. Control inputs are chosen to make the system match some desired trajectory in D steps ahead. Recently, predictive controllers that consider time horizons beyond the system input-output delay (extended horizon predictive controllers) have been used in many engineering applications. The motivation for doing this is two-fold. First, the input-output delays of a dynamic system are usually not known in advance, and if the time delays are incorrectly estimated, or the delays are time varying as system operation progresses, then the system input-output stability can suffer. Second, for high performance controller designs with fast sampling, the resulting sampled dynamic system often has nonminimum phase zeros (having zeros outside the unit circle). In this case, when the choice of control is only based on the beginning of the system step response, the controller often does not perform well.

Inside all extended horizon predictive and adaptive predictive controllers is a "predictor" that estimates future values of certain quantities related to the system outputs, based on current and past values of inputs and outputs. If the prediction horizon k extends beyond the system delay, D, then the set of (k–D) future inputs (u(t),u(t+1), . . . , u(t+k–D)) must be assumed. Different predictive and adaptive predictive controllers make different assumptions (or place different constraints) on these 'extra' inputs. The predicted system outputs are then used to compute the control inputs, based upon some criterion. Several extended horizon predictive controllers have been developed previously. They differ in how the set of future controls is chosen. These controllers include: the Extended Horizon Adaptive Control (EHC), the Receding Horizon Adaptive Control (RHC), the Control Advance Moving Average Controller (CAMAC), the Extended Prediction Self-Adaptive Control (EPSAC), the Generalized Predictive Controller (GPC), the Model Predictive Heuristic Control (MPHC), and the Dynamic Matrix Control (DMC).

The EHC predictive controller developed by Ydstie is based on an Auto-Regressive Moving-Average with auxiliary input (ARMAX) model description of the dynamic system, as described in Goodwin and Sin. The set of k future controls is chosen by minimization of the control effort, subject to the constraint that the k-step ahead predicted output is equal to some desired value. In the EHC, two implementation approaches have been used: extended horizon and receding horizon implementations. In the extended horizon implementation, the set of k future controls is implemented sequentially and updated every k samples. In the receding horizon implementation of the EHC (i.e., the RHC), only the first control in the set is applied to the system. At the next sampling instant, the whole set of k future controls is computed and again only the first one is used. In the extended horizon implementation, the EHC can stabilize both open loop unstable and nonminimum phase systems. The RHC, however, cannot stabilize an open loop unstable system in general.

The CAMAC controller developed by Voss et al, differs from the EHC controller in the selection of the set of future controls. In the CAMAC controller, all k future controls are assumed to be constant. This choice assures offset-free tracking performance in steady state, even without an integral action. The CAMAC controller can also be used for both receding horizon and extended horizon implementations. Again, the CAMAC controller can fail if the open loop system is unstable. Both the EHC and the CAMAC controllers have considered the output at only one future point in time.

The GPC controller developed by Clarke et al extends this idea by allowing the incorporation of multi-slep output predictions. The set of k future controls in the GPC is determined by the minimization of a quadratic cost function of predicted output tracking errors and controls, up to a horizon value into the future. The GPC is implemented in a receding horizon manner, as in the RHC controller. The GPC controller is effective for both open loop unstable and nonminimum phase systems. Because a Controlled Auto-Regressive Integrated Moving-Average (CARIMA) model is used to model the dynamic systems and to predict the output, the GPC controller always contains an integrator. The GPC controller includes the EPSAC controller as a special case.

The MPHC controller by Richalet et. al. makes output predictions, based on an approximated impulse response model. On the other hand, the DMC controller by Cutler and Ramaker are based on an approximated step response model. Therefore, both MPHC and DMC controllers can be only applied to open loop stable systems. However, it should be mentioned that the DMC controller can stabilize a nonminimum phase system.

In short, the model-based "horizon" controllers now being introduced to control chemical reactors such as gas-phase reactors promise greatly improved control both at steady-state and during transitions. The horizon controllers and corresponding method accomplish this partly through the use of feed-forward calculations to determine what the eventual steady-state value of the manipulated variable will be and referencing all "overshoot" and "undershoot" moves relative to this predicted value. It will be appreciated that this feature makes horizon controllers very fast in responding to an upset; however, these model-based horizon controllers are not optimized for dealing with both steady state and transient modes of operation. It will also be appreciated that this feature makes horizon controllers very fast in responding to an upset, but at the cost of making these controllers very susceptible to noise in the signals that are used for making the feed-forward calculation(s). With respect to the latter, these signals need to be smooth to avoid excessive swinging of the manipulated variable, which can be destabilizing to the rest of the plant. Preferably, generation of these "smooth" signals must be accomplished as rapidly as possible.

One of the simplest signal filters available is the low-pass filter having the form:

$$Xf(t)=Xf(t-1)+FIL*[X(t)-Xf(t-1)] \qquad (1)$$

It involves taking the difference between the current measurement, $X(t)$, and the last value of the filtered signal, $Xf(t-1)$, and only moving the filtered signal some fraction of this distance, determined by the value of FIL. Note that for FIL=1, no smoothing is done, while for FIL=0, the raw signal is ignored entirely. For values less than 1, the smaller the value, the greater the smoothing, but the longer the delay in response to a true change in the underlying signal. Note also that the low-pass filter always changes the value of $Xf(t)$ relative to $Xf(t-1)$ except when $X(t)$ happens to exactly equal $Xf(t-1)$. This means that it transmits all the noise, although with a reduced magnitude. Therefore, the only way to get a very smooth filtered signal from a noisy source is to have a small value of FIL and to put up with a slow response.

What is needed is a method for controlling a chemical reactor, e.g., a gas-phase reactor, which employs on-line parametric balances, e.g., pressure and/or density balances, and non-linear modeling to simultaneously control the gas composition, pressure, and chemical content in the final product. What is also needed is a method for rapidly filtering noise from raw data produced by system sensors to minimize the number of unneeded control operations initiated by the control method.

SUMMARY OF THE INVENTION

Based on the above and foregoing, it can be appreciated that there presently exists a need in the art for a method of controlling a chemical process which allows for non-linear effects and incorporates system knowledge and which overcomes above-described deficiencies. The present invention was motivated by a desire to overcome the drawbacks and shortcomings of the presently available technology, and thereby fulfill this need in the art.

The principal purpose of the present invention is to provide a process control method which permits rapid adjustment and stabilization of a chemical reactor. According to one aspect of the present invention, the process control method matches fast control operations with fast measurements, and vice-versa, in order to optimize the process control.

An object according to the present invention is provide a process control method which prioritizes the set points. In an exemplary case, when an imbalance occurs in the system, the process control method of the present invention places the highest priority on maintaining the pressure at set-point, thereby stabilizing the H2/C2 ratio and gas composition.

According to one aspect of the present invention, heat transfer and fluidization will be more consistent due to a stable gas density when pressure is the parameter which is preferentially controlled. According to another aspect of the present invention, manipulated variables are grouped to facilitate transient and steady-state system response Another object according to the present invention is to provide a process control method which employs parametric balances and mathematical models for the controlled reactor to thereby allow the controller implementing the process control method to react more accurately and quickly to perturbations across a wide range of operating parameters. According to one aspect of the present invention, the process control method permits automatic transitions between various product types.

Still another object according to the present invention is to provide a process control method which uses parametric balances and mathematical models for the controlled reactor to thereby allow the controller implementing the process control method to perform set-point changes relatively rapidly. It will be appreciated that the descriptions of relative speeds and reaction rates mentioned above are with respect to an identical system under the control of a conventional PID control system.

Another object according to the present invention is to provide a process control method implementing a filter algorithm that maintains its output signal in response to noise and yet responds very quickly to true changes in the underlying input signal. According to one aspect of the present invention, N-sign filters, where N is a positive integer, with relatively high values of N producing a smoother signal but with greater delay than low values of N, all meet these operating criteria. In particular, an exemplary, modified N-sign filter, where N equals 3, satisfies these seemingly exclusive criteria: it gives a very smooth output signal at steady-state even for a noisy input; and it does not delay the output signal significantly when the input is undergoing a rapid change.

Yet another object according to the present invention is to provide a process control method for filtering one of a received signal or a steady-state output signal generated, in an exemplary case, by the horizon controller.

Still another object according to the present invention is to provide a process-control method for filtering an input signal, wherein the dead-band width of the filter is proportional to the noise in the signal in a first range and wherein dead-band width of the filter is established according to the maximum allowable value of the delay in the filter output signal, thereby accepting more noise in the output signal.

Another object according to the present invention is to provide a process control method for filtering an input signal, wherein the dead-band width can be reduced with the addition of data points processed by the filter (algorithm).

Still another object according to the present invention is to provide a signal filtration method for use with any process controller.

These and other objects, features and advantages according to the present invention are provided by a method for controlling a chemical reactor using a non-linear predictive control. Preferably, the method includes steps for:

generating a plurality of signals representing a current state of the chemical reactor and reflecting a respective constituent of reactants in the chemical reactor;

calculating a future state of the chemical reactor responsive to the plurality of signals and referenced to mass hold-up of the reactants in the chemical reactor; and controlling at least one parameter related to the chemical reactor so as to control the future state of the chemical reactor.

These and other objects, features and advantages according to the present invention are provided by a method for controlling a chemical reactor using a non-linear predictive control.

Advantageously, the method includes step for:

generating a plurality of signals representing a current state of the chemical reactor and reflecting a respective constituent of reactants in the chemical reactor;

generating filtered signals corresponding to the signals responsive to at least three raw data points and a processed respective signal which does not include the three raw data points;

calculating a future state of the chemical reactor responsive to the filtered signals in terms of extensive variables corresponding to the reactants in the chemical reactor; and controlling at least one parameter related to the chemical reactor so as to control the future state of the chemical reactor.

These and other objects, features and advantages according to the present invention are provided by a filter method for filtering a input signal and generating a smoothed signal whereby spurious noise in the smoothed signal is minimized, wherein the filtering method is performed in accordance with the following algorithm:

f3=SIGN[X(t)-Xf(t-3)]*1.0 f2=SIGN[X(t-1)-Xf(t-3)]*1.0 f1=SIGN[X(t-2)-Xf(t-3)]*1.0 fsum=f1+f2+f3

FAC=(ABS(fsum)/3)$^z$

Xf(t)=Xf(t-1)+FIL*FAC*{X(t)-Xf(t-1)} where X(t)=raw data point at time t and Xf(t)=filtered signal at time t.

These and other objects, features and advantages according to the present invention are provided by a filtration method for filtering a input signal and generating a smoothed signal whereby spurious noise in the smoothed signal is minimized, wherein the filtering method is performed in accordance with the following algorithm:

$$FACTOR4 = \text{MIN}\left(1, \frac{\text{ABS}[X(t) - Xf(t-4)]}{DBAND}\right)$$

$$FACTOR3 = \text{MIN}\left(1, \frac{\text{ABS}[X(t-1) - Xf(t-4)]}{DBAND}\right)$$

$$FACTOR2 = \text{MIN}\left(1, \frac{\text{ABS}[X(t-2) - Xf(t-4)]}{DBAND}\right)$$

$$FACTOR1 = \text{MIN}\left(1, \frac{\text{ABS}[X(t-3) - Xf(t-4)]}{DBAND}\right)$$

f4=SIGN[X(t)-Xf(t-4)]*FACTOR4 f3=SIGN[X(t-1)-Xf(t-4)]*FACTOR3 f2=SIGN[X(t-2)-Xf(t-4)]*FACTOR2 f1=SIGN[X(t-3)-Xf(t-4)]*FACTOR1 fsum=INT (ABS(f1+f2+f3+f4))

$$FAC = \left(\frac{\text{ABS}(fsum)}{4}\right)^z$$

$$XS(t) = \frac{X(t) + X(t-1) + X(t-2) + X(t-3)}{4}$$

Xf(t)=Xf(t-1)+FIL*FAC*{XS(t)-Xf(t-1)}, wherein X(t)=raw data point at time t and Xf(t)=filtered signal at time t.

These and other objects, features and advantages according to the present invention are provided by a filtering method for filtering a input signal and generating a smoothed signal whereby spurious noise in the smoothed signal is minimized, wherein the filtering method is performed in accordance with the following algorithm:

$$FACTOR5 = \text{MIN}\left(1, \frac{\text{ABS}[X(t) - Xf(t-5)]}{DBAND}\right)$$

$$FACTOR4 = \text{MIN}\left(1, \frac{\text{ABS}[X(t-1) - Xf(t-5)]}{DBAND}\right)$$

$$FACTOR3 = \text{MIN}\left(1, \frac{\text{ABS}[X(t-2) - Xf(t-5)]}{DBAND}\right)$$

$$FACTOR2 = \text{MIN}\left(1, \frac{\text{ABS}[X(t-3) - Xf(t-5)]}{DBAND}\right)$$

$$FACTOR1 = \text{MIN}\left(1, \frac{\text{ABS}[X(t-4) - Xf(t-5)]}{DBAND}\right)$$

f5=SIGN[X(t)-Xf(t-5)]*FACTOR5 f4=SIGN[X(t-1)-Xf(t-5)]*FACTOR4 f3=SIGN[X(t-2)-Xf(t-5)]*FACTOR3 f2=SIGN[X(t-3)-Xf(t-5)]*FACTOR2 f1=SIGN[X(t-4)-Xf(t-5)]*FACTOR1 fsum=INT(ABS(f1+f2+f3+f4+f5))

$$FAC = \left(\frac{\text{ABS}(fsum)}{5}\right)^z$$

$$XS(t) = \frac{X(t) + X(t-1) + X(t-2) + X(t-3) + X(t-4)}{5}$$

Xf(t)=Xf(t-1)+FIL*FAC*{XS(t)-Xf(t-1)},.

wherein X(t)=raw data point at time t and Xf(t)=filtered signal at time t.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 13A–13F present a series of curves contrasting performance of the conventional PID control method with the control method according to the present invention;

DETAILED DESCRIPTION OF THE PREFERRED EMBODIMENTS

Figure 3:
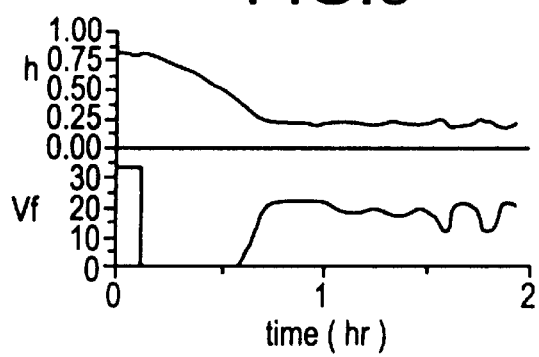
FIGS. 3 and 4 are curves illustrating a common problem, i.e., controller coupling, associated with PID control schemes.
Figure 9:
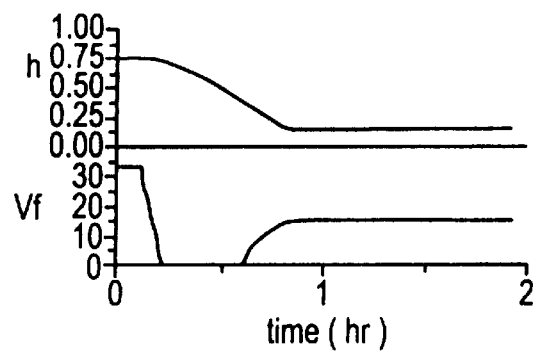
FIGS. 9 and 10 are curves illustrating the elimination of coupling using non-linear horizon control for the system illustrated in FIG. 2.
Figure 4:
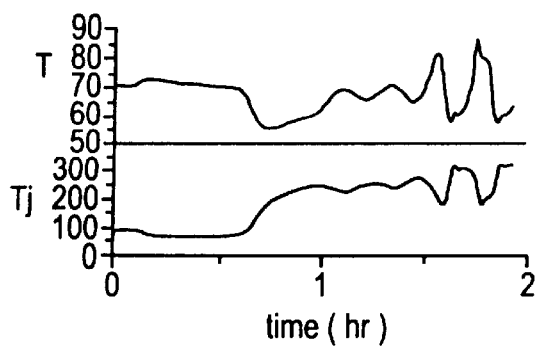
Figure 10:
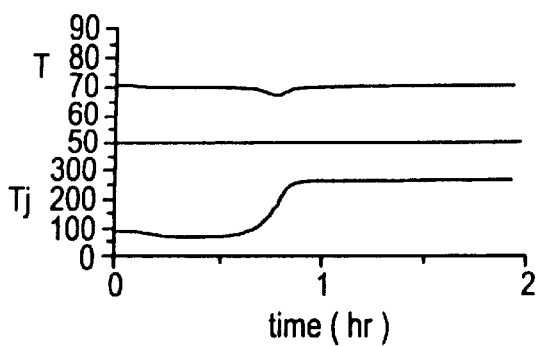
Figure 5:
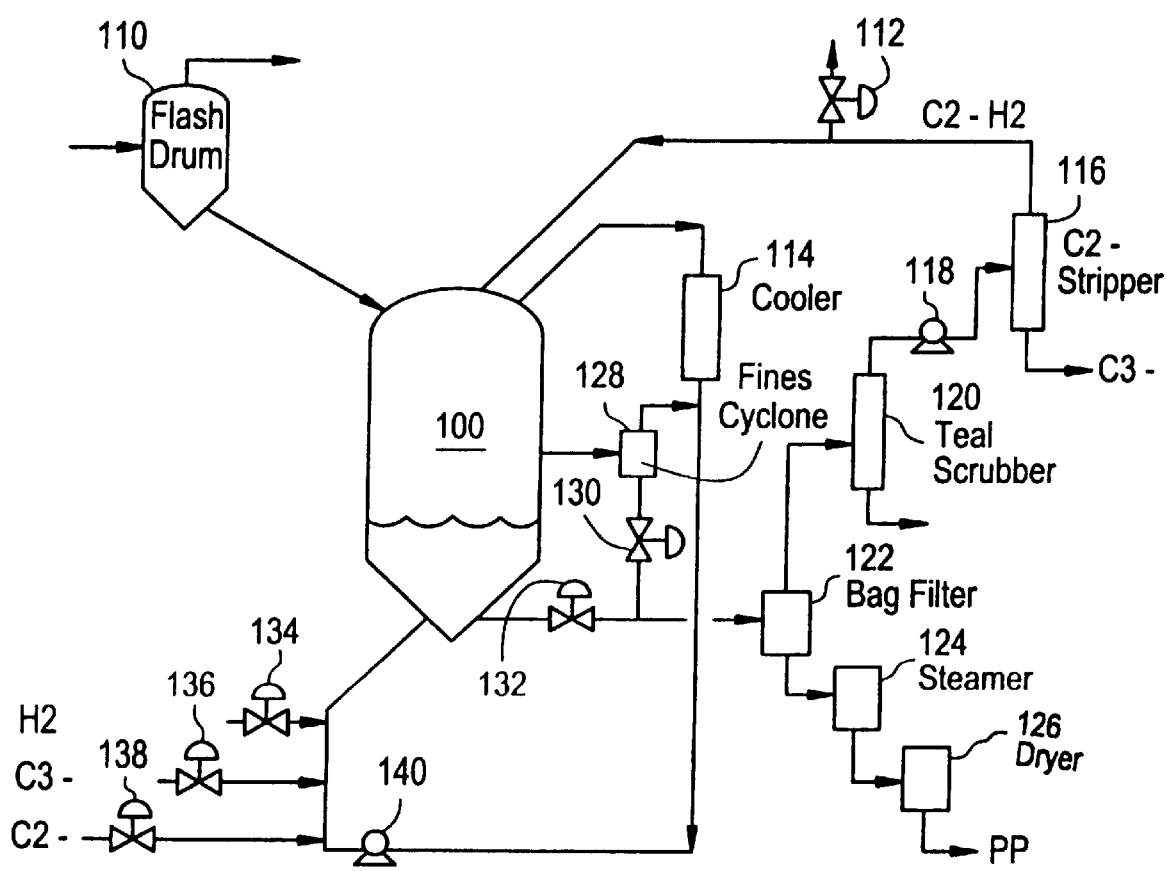
FIG. 5 is a schematic block diagram of a generic gas phase reactor which is useful with both conventional PID control methods and the control method according to the present invention.
Figure 6:
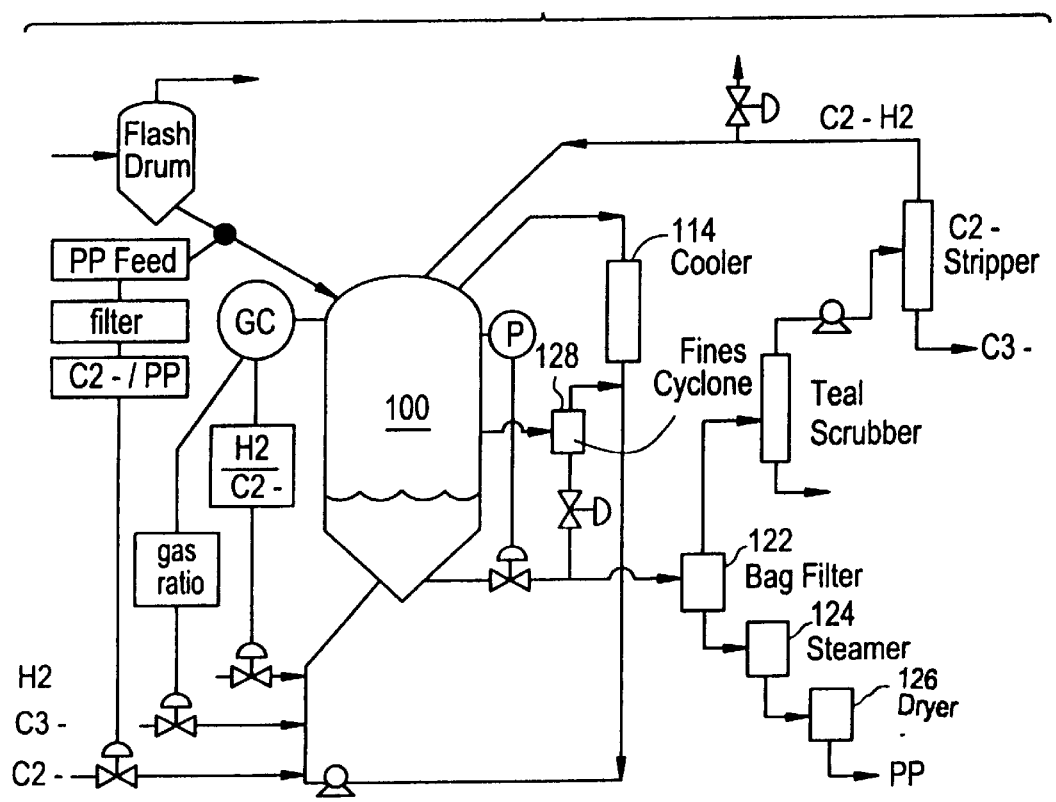
FIG. 6 is a schematic diagram of the generic gas phase reactor and a PID controller.
Figure 7:
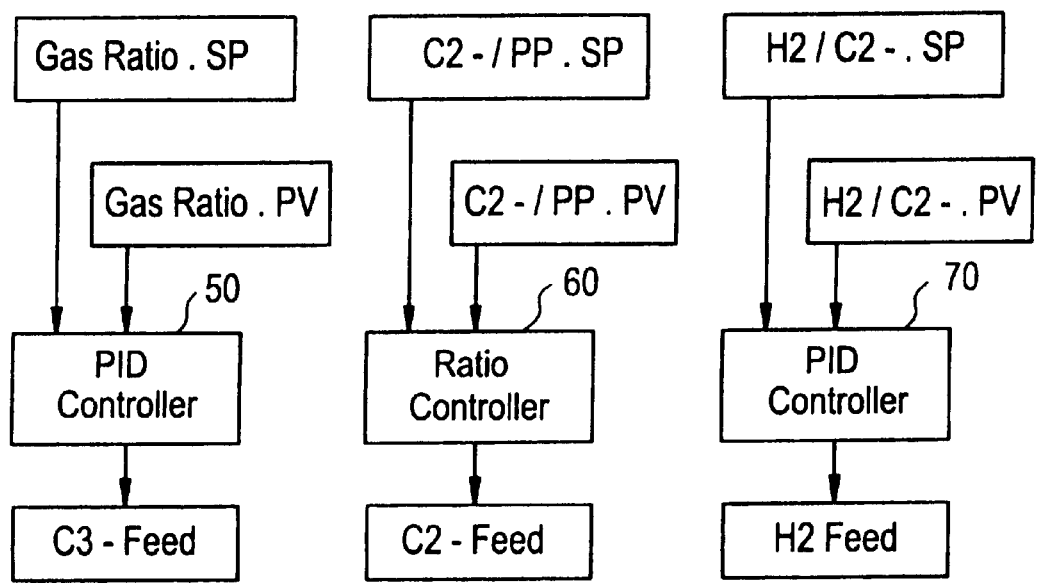
FIG. 7 is a high level block diagram illustrating the functions associated with the conventional PID control method.
Figure 7:
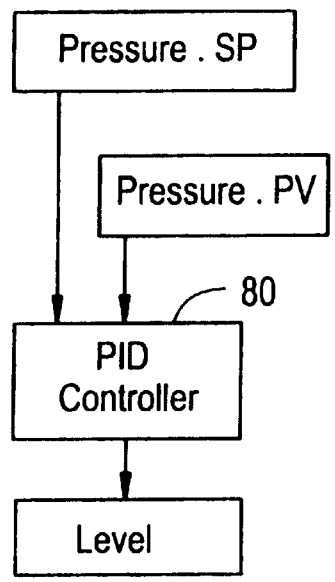

The solution to controlling a non-linear coupled system is to incorporate what is known about the system into process models and then to use these models to predict the effect of any change on the system. In the case of the tank 10 illustrated in FIG. 8, the volume of liquid required for a given, level, the surface, and even the exit flow out the bottom can easily be calculated. From there, it is a relatively simple matter to determine what change needs to be made in the fresh feed Vf and jacket temperature Jt in order to achieve and maintain the set-points. It will be appreciated that level control method employed with the system of FIG. 8 will not actually control the level in tank 10 at all; the control method actually controls the calculated mass hold-up of liquid in the reactor. That way, if the temperature deviates from its set-point, even though the level will change due to the change in liquid density, the mass control method will not respond since the mass is still on target. It should be mentioned that using models in this way permits decoupling of the two control loops, as illustrated for example in FIG. 6, to reduce interference, thereby allowing both of the control loops to be very responsive to parameter variations without leading to the instability found with conventional PID control systems. This can be seen in FIGS. 9 and 10, where a level change substantially identical to that illustrated in FIGS. 3 and 4 has been made with far more satisfactory results.

Figure 1:
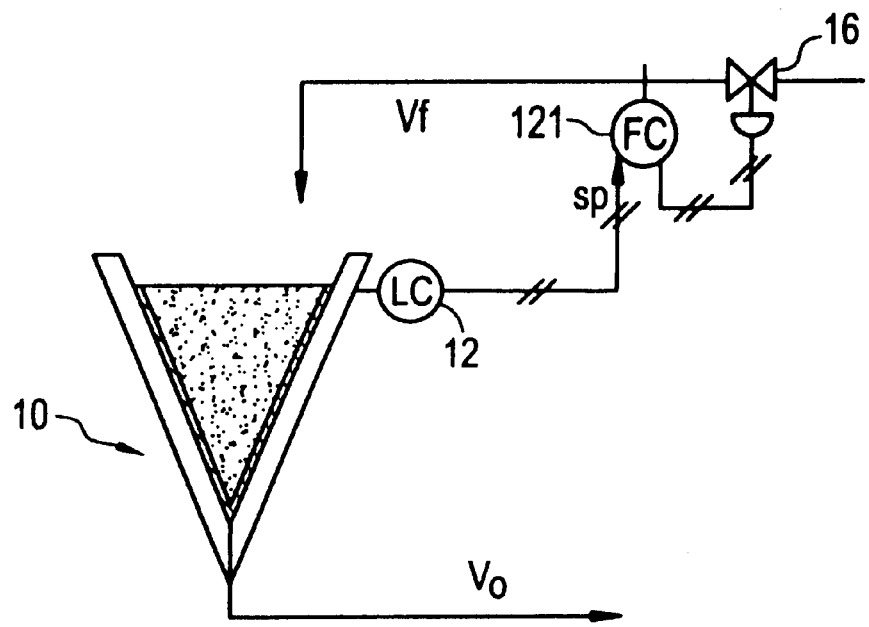
FIGS. 1 and 2 are simplified block diagrams for illustrating the operation of hypothetical simple and complex control schemes, respectively.
Figure 2:
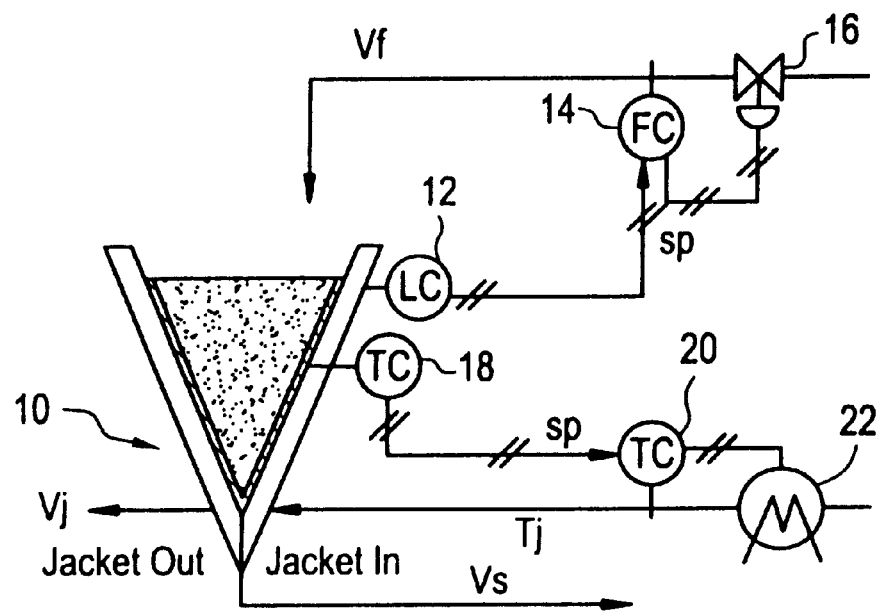
Figure 8:
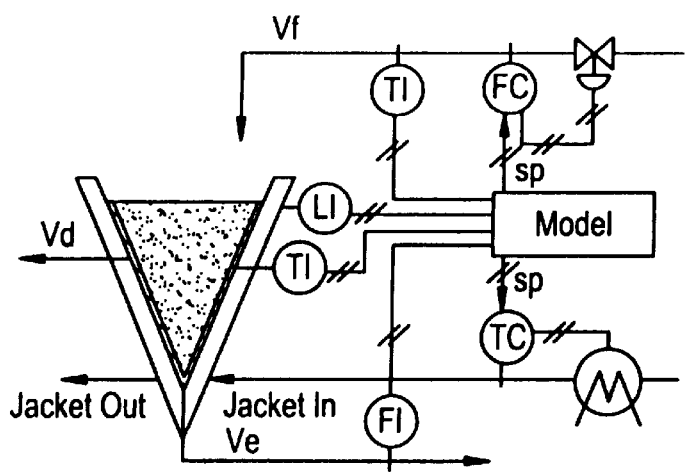
FIG. 8 is a high level block diagram of the system illustrated in FIG. 2 but employing the control method according to the present invention.

It should be noted that the process control method according to the present invention applies a penalty in that a larger amount of system data must be monitored in order to achieve the desired control. Thus, in the exemplary system illustrated in FIG. 8, tank level, tank temperature, effluent flow rate Ve, feed flow rate Vf, and feed temperature must all be measured and corresponding data must be passed to the model for use in the extensive property balances, e.g., pressure and/or density balances, and model-based control method calculations. The set-points for the feed flow Vf and jacket temperature Jt are then passed back to the slave controllers FC and TC after every execution of the process control method. It should also be noted that the fictitious stream Vd illustrated in FIG. 8 represents any unmeasured discharge from tank 10 together with model and measurement errors.

An extensive technical assessment of a new control method for gas-phase reactors (GPRs), i.e., the Non-linear Model Predictive Control (NMPC) method, which method employs on-line parametric balances and non-linear modeling to simultaneously control the gas composition, pressure and constituent, i.e., ethylene, content of the final product has been completed. The NMPC method according to the present invention preferably controls the gas pressure for each ingredient in the GPR using horizon control technology. Advantageously, the NMPC method uses the same set-points as used by conventional PID controllers: H2/C2 ratio; gas ratio; pressure; and C2/homopolymer ratio, which greatly simplifies migration to, and training in, the NMPC methodology.

The NMPC method is a multivariable control method, in contrast with the conventional practice which employs four individual PID controllers. As discussed above, because of the deadtime of the overall system and the interaction between reactor parameters, the conventional PID controllers must be tuned to be very slow to react so as to avoid instability effects due to, for example, controller coupling. It will be appreciated that this results in frequent set-point offsets. The NMPC method, on the other hand, predicts the interactions between the various measured parameters so that a controller operating in accordance with the NMPC method can be tuned more aggressively, giving to the NMPC controller both more stability and quicker response to set-point changes.

It should be mentioned at this point that since the NMPC method is based on pressure balances, it is possible to calculate on-line quality parameters including: % ethylene: % xylene soluble: and % bipolymer. It will be appreciated that any difference between lab results and the calculated quality parameters is due primarily to modeling error.

The NMPC method was first tested on a simulator, which is normally used for operator training. It will be appreciated that since the simulator was designed to have accelerated dynamics to challenge operators, the simulator provided a severe test bed for evaluation of a controller operating in accordance with the NMPC method. The simulator was used in the assessment to test the overall NMPC control method concept as well as to show the NMPC method's response to severe disturbances. The tests on the simulator were performed over several months. It will be appreciated that the simulator's use was not limited solely to demonstrating the concept of NMPC control, it also served to prepare the technical and operating staff for the plant trial. The simulator was used as a pass or fail test, before allowing any plant test, which testing is described in greater detail immediately below.

For the plant test, two main performance criteria were established, assuming that the NMPC method according to the present invention was shown to be acceptable on the simulator:

(a) stability of each controller using the NMPC method in steady-state (H2, C2, C3, % C2), and (b) transient response of the H2 controller. The actual proof of concept plant tests were performed on a GPR.

Figure 11:
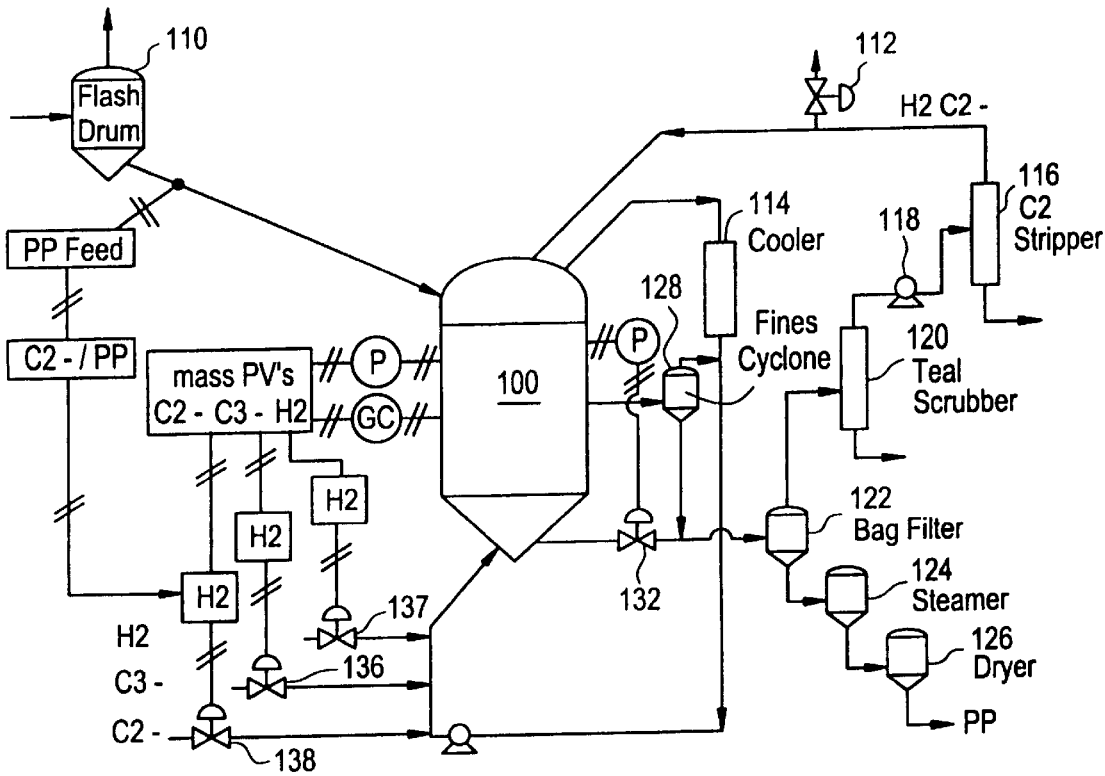
FIG. 11 is a high level block diagram of the generic gas phase reactor using the control method according to the present invention.

FIG. 11 illustrates the control scheme, i.e., the NMPC method according to the present invention, wherein a lead controller manipulates the feed of constituents, e.g., ethylene and propylene, in order to maintain the pressure in GPR 100 within very tight bounds. As previously discussed, the gas composition GC must be maintained, and this is advantageously preformed by adjusting the ratio of ethylene to propylene in the monomer feed.

It should be mentioned that a faster response advantageously can be achieved by using an IR sensor to determine the gas-ratio every second instead of using the GC to obtain the gas ratio approximately every six minutes. In order to improve the dynamic response of the models and reduce the deadtime of the gas chromatograph (approximately five minutes), a new sensor using infra-red (IR) spectroscopy permits measurement of the ethylene and propylene content in the gas phase of the GPR 100. The IR spectroscope provides a continuous signal which is then reconciled with chromatograph values. Invisible to the IR, the hydrogen must still be controlled using only the GC. It should be noted that the use of the infrared analyzer on the C2 and C3 feeds, rectified by the chromatograph, provided a continuous and precise signal that lead the chromatograph output by approximately 4 minutes. The full benefit of the IR spectroscope advantageously can be seen when the NMPC method is used for sensing and controlling transitions involving the gas ratio, and during other system perturbations.

It will be appreciated that the end product of the exemplary GPR 100 control system illustrated in FIG. 11 must have the proper ethylene content. Therefore, the NMPC method must insure that, on average, the ratio of the ethylene feed to the homopolymer feed is the same as that which would have been used in a GPR having a control system using conventional PID control. It will be appreciated that this control was previously accomplished by adjusting the ethylene feed directly. In contrast, the ethylene feed cannot be completely controlled in an effort to control ethylene content since the ethylene feed is being partially set by the pressure controller P in the system employing the NMPC method. Instead, the NMPC method according to the present invention maintains the polymer bed in the reactor 100 at the level which causes the pressure controller P to feed the quantity of ethylene required.

It should be mentioned that the NMPC method places the lead controller on the most important variable, e.g., pressure in the GPR 100 under discussion. By maintaining the pressure at a steady value, the system also maintains the gas density which affects the fluidization and heat transfer in the reactor 100. In addition, a steady pressure advantageously will stabilize the flows of gas into the reactor 100 from the flash drum 110 and out of the reactor 100 to the bag filter 122, making it easier to maintain the proper gas composition, since propylene enters the reactor 100 from the flash drum 110 and leaves the reactor 100 via the ethylene stripper 116.

Another advantage to the NMPC method according to the present invention is the matching of response times. Preferably, the pressure reading is available every few seconds; the system controller using the NMPC method controls pressure in GPR 100 with the monomer feeds, which advantageously can be changed very quickly.

Figure 12:
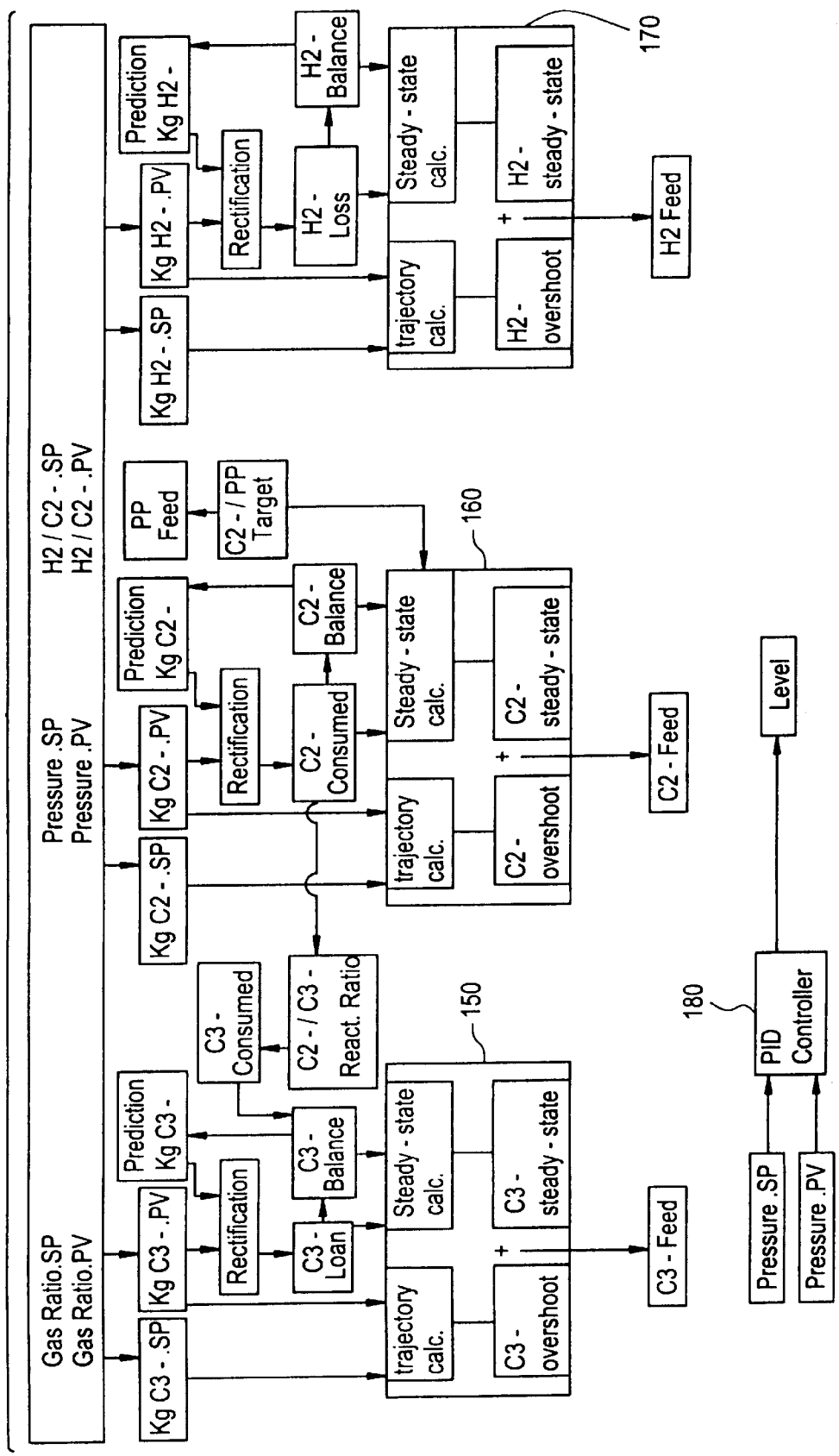
FIG. 12 is a high level block diagram illustrating the functions associated with the control method according to the present invention.

A high level block diagram of the controller implementation the NMPC method according to the present invention is shown in FIG. 12. It will be appreciated that the change in control philosophy reflected by the NMPC method has been made possible by using process models to decouple the system controllers. Unlike the conventional PID control scheme, which uses intensive variables, i.e., variables not based on quantity such as H2/C2 ratio, C2/C2+C3) ratio, and C2/PP ratio (analogous to level in the conical tank), the model-based NMPC method controls the GPR 100 based on extensive variables, e.g., mass hold-up of each component in the reactor 100 or pressure in the GPR 100 or density of the reactants in the GPR 100. For example, the set-point for gas composition, together with the volume of the system, readily allows determination of how many kilograms of each component are required to achieve the desired system target.

There are a myriad of references, such as the article by C. Georgakis et al. entitled "On the Use of Extensive Variables in Process Dynamics and Control (Chem Eng. Sci., Vol. 41, pages 1471–1484 (1986)), which detail the basics of plant control with respect to extensive variables. However, these references do not disclose the generating a nonlinear predictive model for use with model predictive controllers where the model takes the form:

$$\text{Manipulated Variable(s)} = \text{Steady State Term(s)} +$$

$$\text{Dynamic Term(s)} + \text{Error Term}$$

The predictive model in this form is particularly advantageous in that it separates the extensive variables in groups which are particularly suited to either steady state operations or transient operations. This facilitates extremely fast MNPC system response, since large parameter changes can be initiated in response to system transients while other very small parameter changes can be made during steady state operations. It will be appreciated that the error term is generated withing but applied outside of the NMPC system, which advantageously permits the error term to be a dynamic measure of controller error. See FIGS. 11 and 12.

By way of example, when an upset in the C2 hold-up occurs, the C2 controller 160 will respond and the H2 controller will not, thus allowing the H2/C2 ratio to deviate from target, since the control system utilizing the NMPC method knows that the right amount of hydrogen H2 is already present in the GPR 100. In this manner, when the C2 disturbance has been eliminated, the C2 set-point will be re-established. Additionally, it will be appreciated that the mass balances made for each component allow prediction of corrections are needed to respond to a change of a set-point or disturbance in the reactor 100.

To summarize, the NMPC method, by applying the knowledge of the system to create controllers based on extensive system properties, makes it possible to decouple the system, thus allowing fast action by all of the individual controllers in the system without sacrificing system stability. In addition, the use of parametric balances permits the controllers implementing the NMPC method to anticipate problems and respond accordingly to minimize the effects of disturbances and to allow fast transitions, i.e., set-point changes.

The NMPC method according to the present invention was tested on an actual operating gas-phase reactor under both steady state and transient conditions for various products. The plant test results are presented below. It is important to note that the actual plant trial was conducted with essentially no disturbances to the production, which is always a first objective throughout any process control development. The control strategy commissioning and testing on the actual plant was completed within only two weeks in total.

During plant trials for steady state operations, the controller employing the NMPC method performed very well, reducing the coefficient of variation (COV) for H2/C2 relative to the conventional controller using PID control by a factor of 2 for a first product and a factor of 5 for a second product. See FIG. 13A. More specifically, the following differences were achieved:

(A) NMPC control
  (1) H2/C2 variation is held within 20 ppm.
  (2) R2401 upset due to bottom discharge obstructions. NMPC minimized upset.
  (3) To maintain H2/C2 ratio under tight control, larger and more frequent moves are made to H2 feed rate.
(B) Conventional control (PID)
  (4) Control to set-point is not as tight. Drift occurs.
  (5) Only slow changes are made to H2 feed rate.
  (6) Flow disturbance in the recycle compressor (C2301) causes loss of H2 recycled to reactor. PID controller slowly increased H2 feed to compensate.
  (7) Recycle compressor is back in service. PID controller is slow to cut H2 feedback to steady state flow (18 hours were required to regain stability). NMPC would have responded more quickly both to increase H2 flow initially and to cut it when normal operation resumed.

Figure 13A:
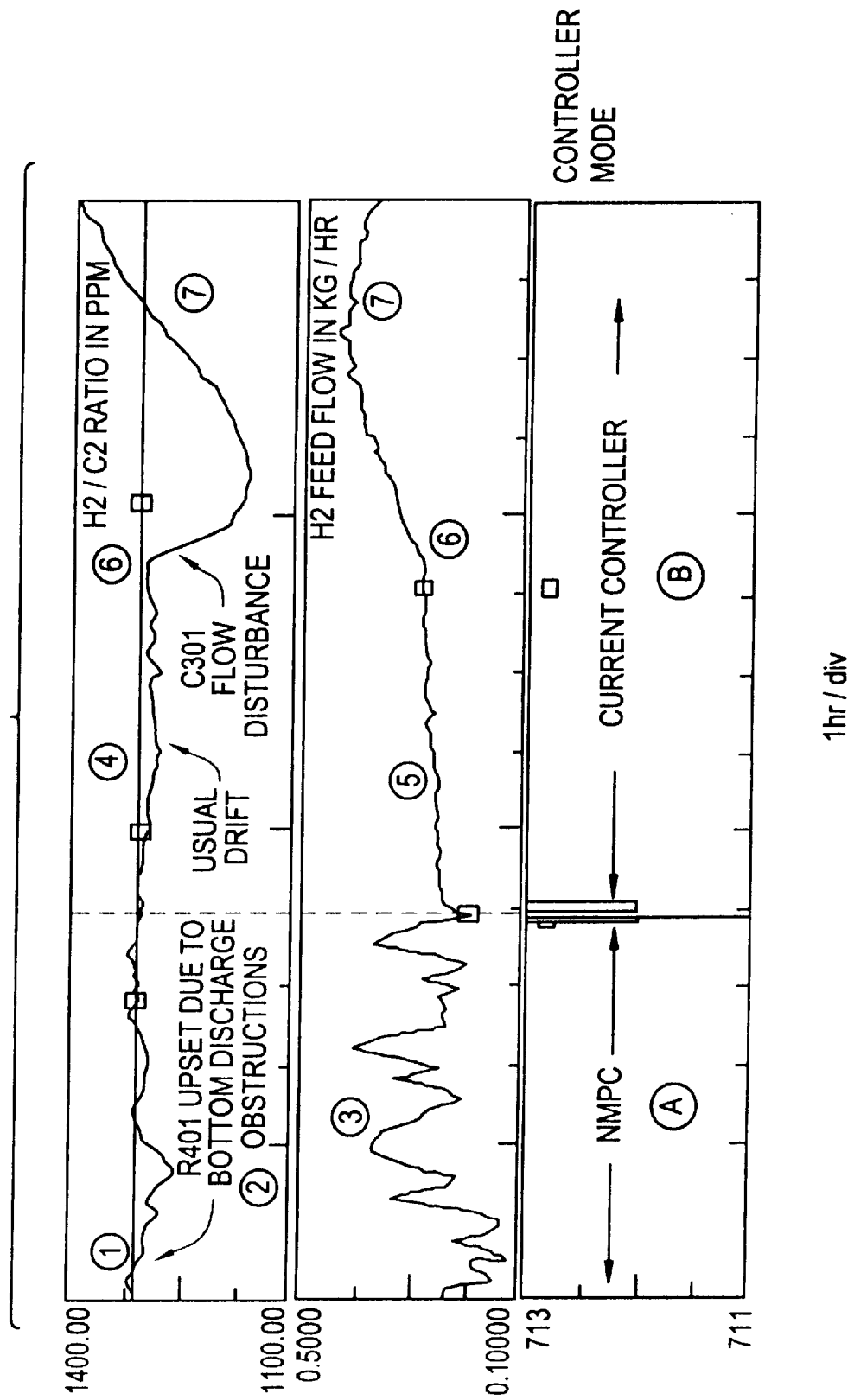

It will be appreciated that the numerals in brackets 0 correspond to the specified points on the curves of, for example, FIG. 13A. In addition, the variation in the gas ratio C2/C2+C3 remains constant for products (See FIG. 13B) while the variation of the calculated quality parameters, i.e., % C2 and % bipolymer, was reduced for the first product (See FIG. 13C). It should be mentioned that in order to see improvement for the Second product, more aggressive tuning on the level controller would be required.

Figure 13B:
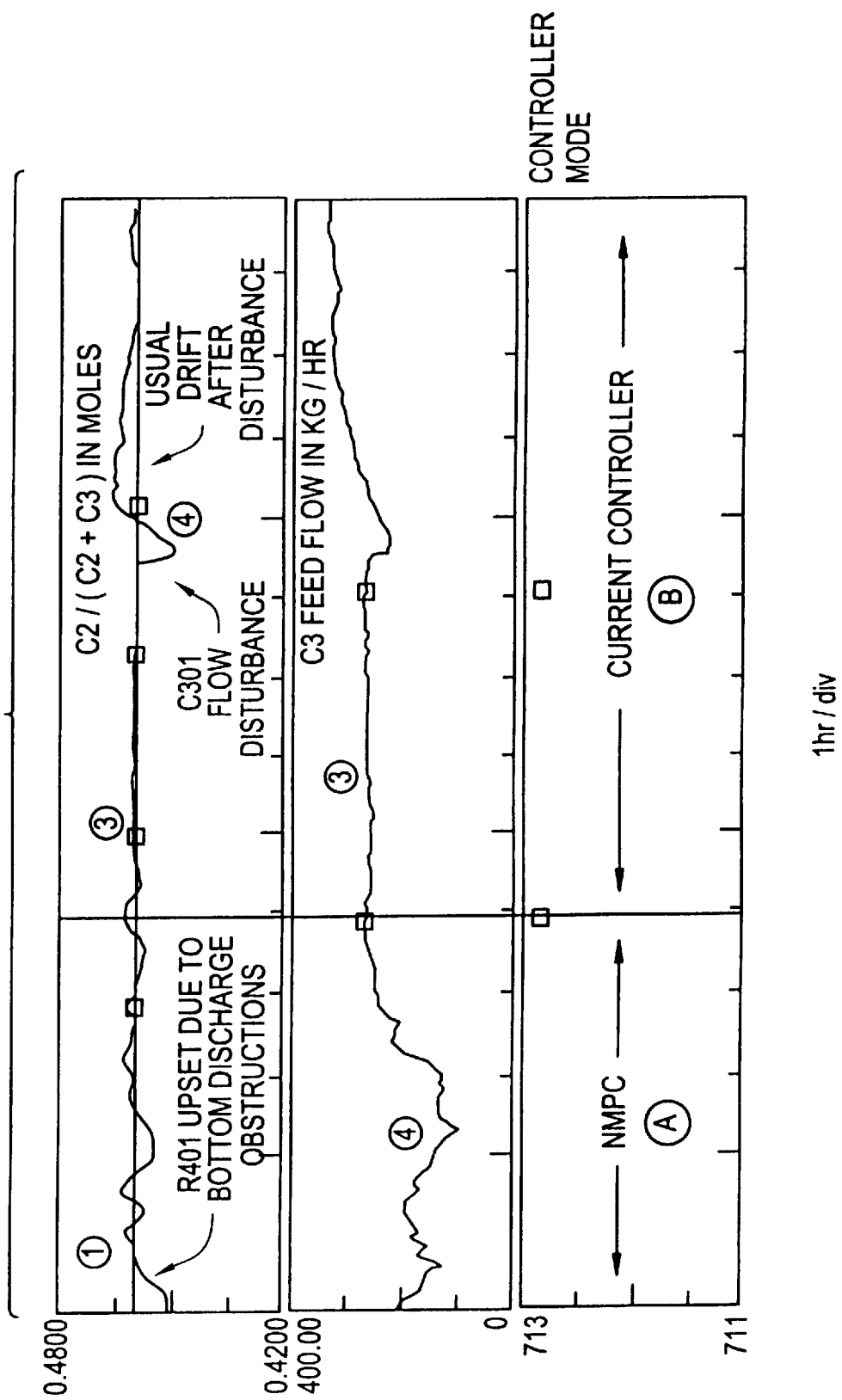

In particular, the following differences between the NMPC method and the conventional PID control method were realized as shown in FIG. 13B:

(A) NMPC control
  (1) C2/C2+C3) ratio is tightly controlled, even with reactor upset due to bottom discharge obstructions.
  (2) As with H2, the propylene flow is moved more aggressively in NMPC control.
(B) Conventional control (PID)
  (3) In steady state condition and without disturbance, PID control variation is small.
  (4) The response to the disturbance is too slow to prevent the drift and it takes many hours to return to set-point.

Figure 13C:
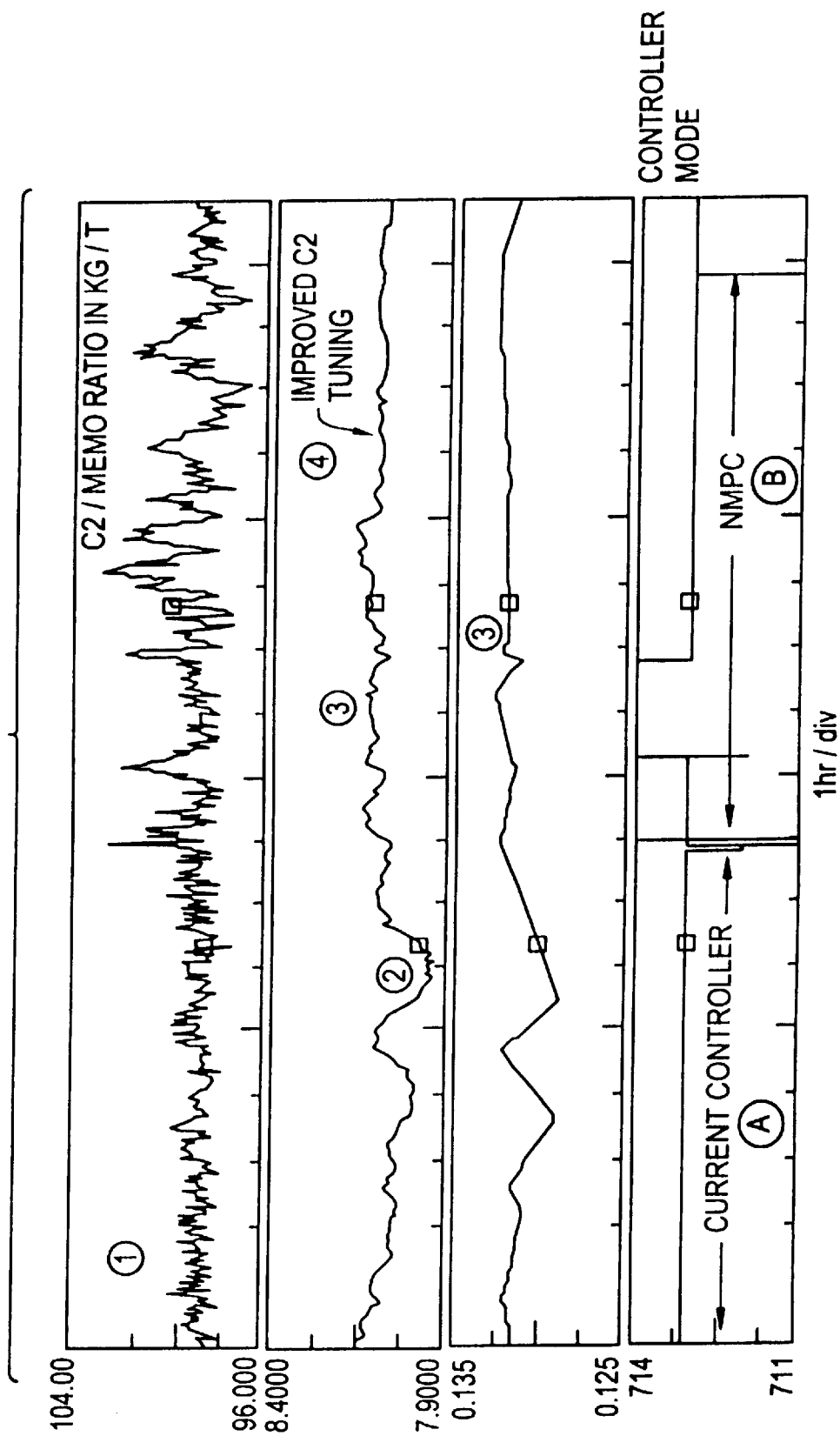

Moreover, the following differences between the conventional PID control method and the NMPC method are depicted in FIG. 13C:

(A) Conventional control (PID)
  (1) Since the PID controller is based on maintaining C2 feed/homo ratio constant, the variation of this parameter is lower.
  (2) However, the true quality parameter of interest is % C2 final (C2 consumed/total polymer) which fluctuates more under PID control due to homopolymer discharge rate variation.
(B) NMPC control
  (3) Notice that the % C2 is very steady at +/−0.05% for the entire 10 hour period.
  (4) Improved tuning reduced the fluctuations in the C2 feed, which further improved the stability of the calculated quality parameters (% C2 final, % bipolymer).

In order to conduct plant trials with respect to transients, two set point changes were made, one for each of the products. In the first case, the set point for the first product was adjusted to 50 ppm, which required 2 hours to achieve steady state conditions. In the second case, the set point of the H2/C2 ratio for the Second product was increased to 100 ppm, which required 1.7 hours to reestablish steady state operations. It should be mentioned that both of these results are considerable improvements over the average 15 hours for the controller using conventional PID control methods.

The system controller implementing the NMPC method was also used to stabilize the hydrogen after a transition from the first product into the Second product, as illustrated in FIG. 13D. Initially, the H2C2 ratio was 75 ppm from set-point and was in a roll caused by the slow action of the conventional PID controller. When turned on, the controller utilizing the NMPC method immediately broke the roll and brought the H2/C2 ratio to target in approximately 1.0 hour. Without the NMPC method, the roll would have lasted for up to 10 additional hours, with decreasing amplitude. The results depicted in FIG. 13D are as follows:

(A) Conventional control (PID)
  (1) Because of the system dead-time and interactions, the PID must be tuned very slow. Even though it is 75 ppm from set-point, only very small increases are being made to H2 feed.
  (2) This roll had persisted for 3 hours at this point and moves were made in manual by the operator. Another 10 hours would have been required for the PID controller to eliminate this roll.
(B) NMPC control
  (3) When turned on, NMPC calculates the "overshoot" of H2 required to bring the H2/C2 ratio to target within the TSS specified (60 minutes here).
  (4) As in FIG. 13A, the H2 feed is moved aggressively to maintain the H2/C2 ratio at set-point.

Figure 13E:
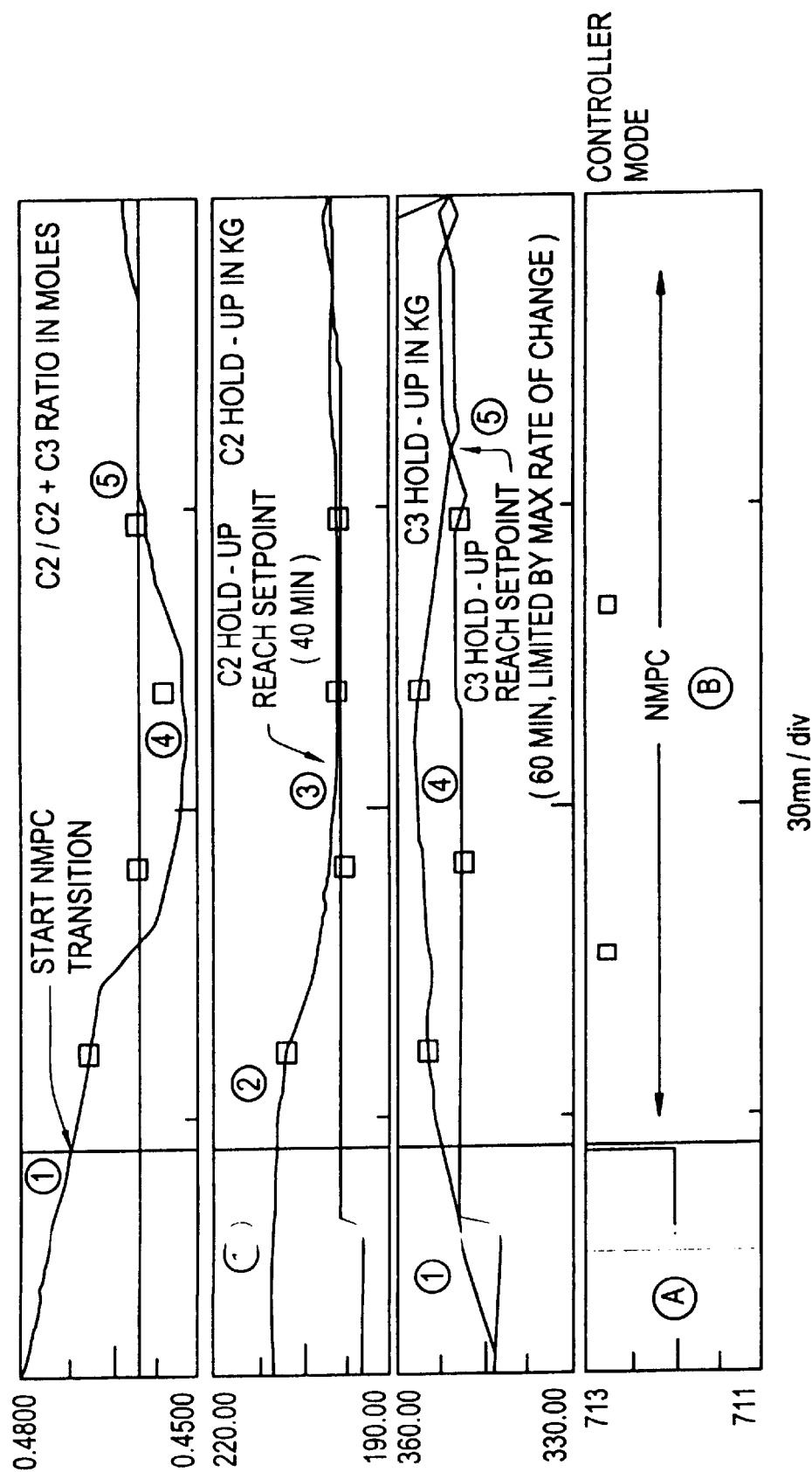
Figure 13F:
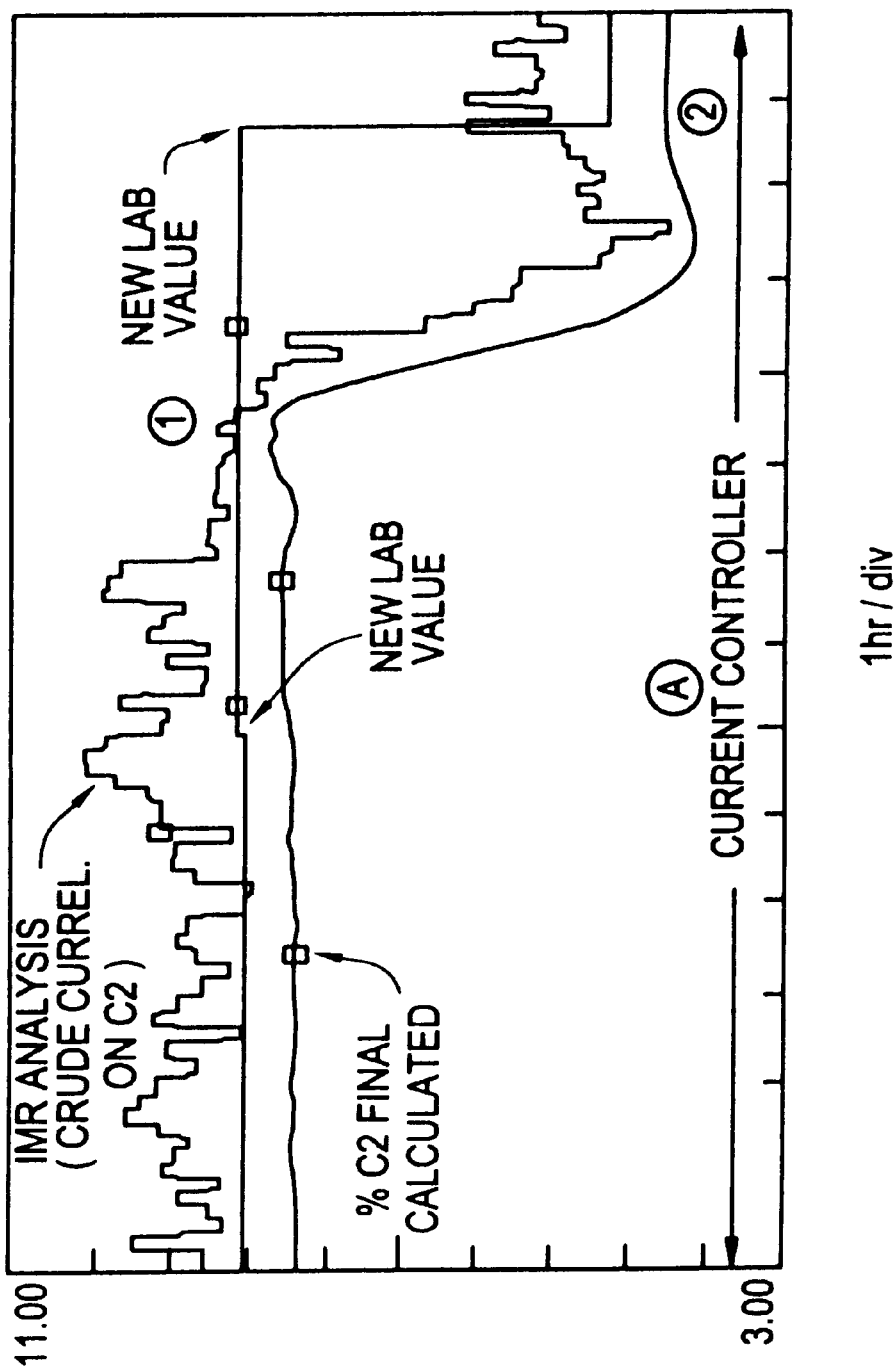

The NMPC method according to the present invention was used at the end of a transition going from the first product to the Second product to stabilize the gas ratio, as illustrated in FIG. 13E. The move was made going from 0.472 to 0.460. The C2 reached its new target within the specified 40 minutes, while C3 took 60 minutes due primarily to the limited rate of change that was allowed on the C3 flow. The estimated 40 minute transition time, and even the somewhat long actual transition time compares very well with the 3 hours required for a similar change using conventional PID control. The results depicted in FIG. 13E are as follows:

(A) Conventional control (PID)
  (1) Even though we are far from set-point, only small changes are being made. Three hours would be required to reach set-point with PID control.
(B) NMPC control
  (2) NMPC is started and the new set-point entered. Immediately, large changes are made to C2.
  (3) After 40 minutes, C2 hold-up has reached its target as desired.

(4) The C2/C2+C3) ratio is now below target because the C3 is too constrained by an adjustable parameter (maximum rate of change). This indicates that a larger value for the rate of change should be used.

(5) C3 reaches set-point (20 minutes later) and C2/C2+C3) is at set-point after 60 minutes, about 2 hours faster than PID.

Figure 14A:
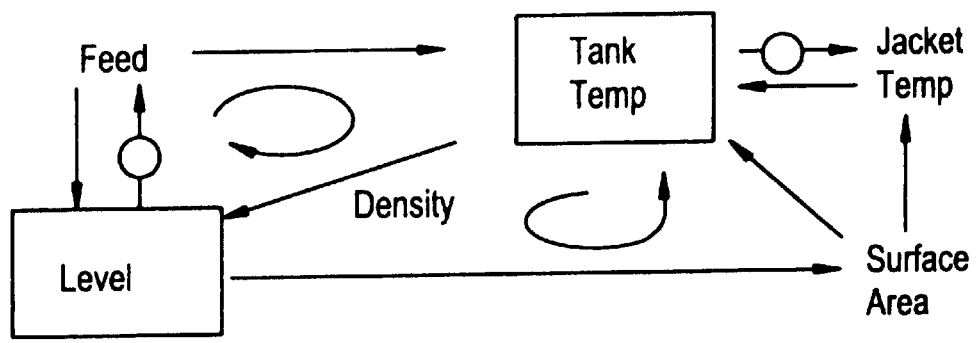
FIGS. 14A and 14B illustrate coupling and lack thereof in PID and horizon controlled systems, respectively, for the system illustrated in FIG. 2.
Figure 14B:
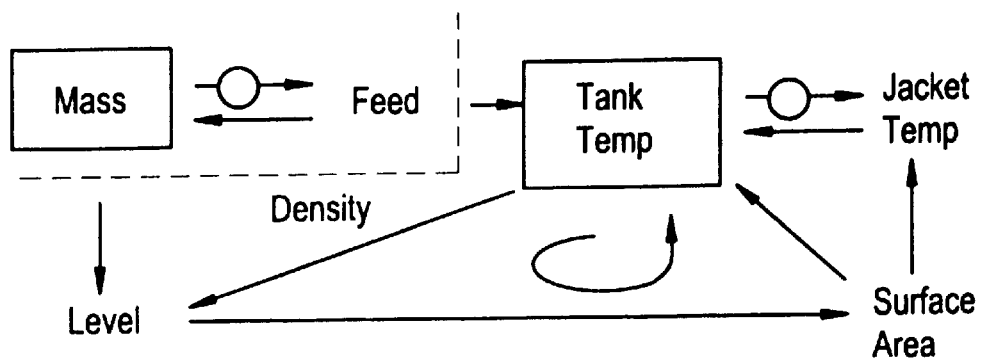

It should be mentioned that all NMPC calculations are based on mass balances for each ingredient (H2, C2, C3). From those, the consumption of C2 and C3 are estimated and then used in the horizon controller of each ingredients, as best seen in FIG. 12. Using the consumptions, the % C2 in the final product is also calculated. Since the model calculations are available even if the NMPC method according to the present invention is not being used, it was possible to compare the calculated % C2 with lab and IMR values during the transitions. These results are illustrated in FIG. 14F. It should be mentioned that the comparison demonstrated that the dynamic behavior of the calculation (the slope) matched that of the IMR on-line analysis. The subsequent lab results confirmed the end of the transition.

(A) Conventional control (PID)
(1) Note that the % C2 measured by IMR drops with about a 30 minute lag compared to the % C2 predicted but at the same rate. The lag is the result of the residence gas phase reactor—this could be accounted for if desired).
(2) The calculation also agrees with the IMR regarding the completion of the transition.

Because the dynamics of the % C2 calculation agree well with the plant response, it is possible to evaluate the controller performance (NMPC methods vs. PID methods) over the variation of the quality parameters, even if quality variations are smaller than the lab detection capability. The average model error ((Lab-Calc)/Lab) was +14.5% for the Second product and +8.5% for the first product. For the last two runs, the offset remained constant for both products.

As discussed above, a digital filter has been developed which improves significantly over the performance of the low-pass filters now commonly in use in conventional applications in that the novel filter gives a very stable steady-state signal while still responding quickly to movement in the input. The horizon controllers now being installed in many chemical plants use a conventional NMPC method to give feed-forward response to set-point changes or process upsets. This feature, however, makes them susceptible to noise in the signals that are used for the horizon calculations. Moreover, unwanted noise in the signals corresponding to the measured parameters can cause the horizon controllers to swing the manipulated variable excessively, thus upsetting other control loops. Use of a conventional low-pass filter on the input signals can smooth the action of a horizon controller such as that employing the NMPC method, but only at the expense of delay, which both degrades horizon controller performance and negates one of the principal advantages associated with horizon controllers.

The N-sign filter according to the present invention advantageously provides a very smooth signal with virtually no delay, which leads to dramatically reduced movement of the manipulated variable and an overall stabilizing of the NMPC process. The advantages associated with the N-sign filter were demonstrated using a dynamic simulation of the density horizon controller, which horizon controller had been seen as being highly susceptible to noise in the sensed signals. The algorithm representing the N-sign filter according to the present invention can be easily implemented in any conventional controller with modest programming capabilities. Preferably, the N-sign filter is implemented as a stand alone device, which advantageously can be disposed at any point in the control system, i.e., either upstream or down stream of a horizon controller. It should noted be that the N-sign filter is not limited in its application to horizon controllers; the performance of conventional PID controllers advantageously should be improved as well by use if the N-sign filter.

The model-based "horizon" controllers now being introduced to control GPR 100, as discussed in detail above, hold the promise for greatly improved control both at steady-state and during product transitions. It will be appreciated that horizon controllers and corresponding method accomplish this partly through the use of feed-forward calculations to determine what the eventual steady-state value of the manipulated variable will be and referencing all "overshoot" and "undershoot" moves relative to the steady-state value. This feature makes the horizon controllers very fast in responding to an upset; this feature also makes the horizon controllers very susceptible to noise in the signals that are used in making the feed-forward calculation. These signals need to be smooth to avoid excessive swinging of the manipulated variable, which can be destabilizing to the rest of the chemical plant.

For example, a density horizon controller employing the NMPC method according to the present invention uses the production rate value from the parametric, e.g., thermal, balance to determine what the steady-state monomer feed must be. Noise in the production rate signal will cause swings in the monomer feed, which upsets the temperature control, the pressure drum, and the back end of the (GPR 100. Therefore, the production rate signal used by the horizon controller must be smoothed. However, a conventional low-pass filter provides a very smooth output signal only at the expense of a delay of many minutes to any movements in the input signal, which hampers the performance of the horizon controller. It will be appreciated that significant signal delay may lead eventually to oscillations in the loop density.

Thus, the development of the N-sign filter was motivated by the desire to find a more efficient way of filtering the input signals that would provide a very smooth signal at steady-state without introducing a appreciable delay, i.e., time lag, in the signal provided to the horizon controller for use in predictive calculations. In other words, the goal of the investigation which lead to the N-sign filter work was to develop a filter that would not change its signal in response to noise and yet would be able to respond quickly to true changes in the underlying signal. The filter presented immediately below, designated the N-sign filter, meets these criteria. As mentioned previously, while the N-sign filter was designed with the needs of the horizon controller in mind, the N-sign filter advantageously will improve the performance of conventional PID controllers as well.

As discussed above, one of the simplest signal filters available is the low-pass filter:

$$Xf(t)=Xf(t-1)+FIL^*[X(t)-Xf(t-1)] \qquad (1)$$

It involves taking the difference between the current measurement, $X(t)$, and the last value of the filtered signal, $Xf(t-1)$, and only moving the filtered signal some fraction of this distance, determined by the value of FIL. Note that for FIL=1, no smoothing is performed, while for FIL=0, the raw signal is ignored entirely. For values less than 1, the smaller the value, the greater the smoothing, but the longer the delay in response to a true change in the underlying signal. Note also that the low-pass filter always changes the value of $Xf(t)$ relative to Xf(t−1) except when X(t) happens to exactly equal Xf(t−1). This means that it transmits all the noise, although with a reduced magnitude. Therefore, the only way to get a very smooth filtered signal from a noisy source is to have a small value of FIL and to put up with a slow response.

The theory of the N-sign filter is very simple, the control system examines the last N, e.g., 3, raw data points and compares the raw data points with the value of the filtered signal that immediately precedes them. It will be appreciated that the immediately preceding filtered signal is in no way influenced by the N raw data points. When the N raw data points all lie on one side of that immediately preceding filtered signal point, the next value of the filtered signal will advantageously move toward the N raw data points, as discussed in greater detail below. However, when the N raw data points lie on both sides of the immediately preceding filtered signal point, the N raw data points are considered to represent noise. For that reason, the immediately preceding filtered signal will change little in response to the N raw data points.

The discussion which follows will begin by laying out the basic, unadorned N-sign filter and then proceed to show how the basic N-sign filter can be customized for operation with the NMPC method according to the present invention.

Basic N-sign Filter (N=3)

$X(t)$=raw data point at time t $Xf(t)$=filtered signal at time t $$f3 = \text{SIGN}[X(t) - Xf(t-3)] * 1.0 \quad (2)$$

$$f2 = \text{SIGN}[X(t-1) - Xf(t-3)] * 1.0 \quad (3)$$

$$f1 = \text{SIGN}[X(t-2) - Xf(t-3)] * 1.0 \quad (4)$$

$$fsum = f1 + f2 + f3 \quad (5)$$

$$FAC = (\text{ABS}(fsum)/3)^z \quad (6)$$

$$Xf(t) = Xf(t-1) + FIL * FAC * \{X(t) - Xf(t-1)\} \quad (7)$$

It should be clear that the basic N-sign filter is a low-pass filter with the term FIL being multiplied by a new term, FAC. For each raw data point, the SIGN function is employed to determine whether it lies above or below the reference filtered signal value, Xf(t−3), i.e., the most recent value of the filtered signal not affected by the three raw data points. See FIG. 15.

The SIGN function returns a value of +1 for a positive number and −1 for a negative value.

For example:

$$\text{SIGN}(10.3-8.1) = +1 \quad (8)$$

$$\text{SIGN}(8.1-10.3) = -1 \quad (9)$$

Given that fsum=f1+f2+f3 and that the "f" terms can be +1 or −1, the possible values of fsum are given in Table I below.

TABLE I

| f1 | f2 | f3 | fsum |
|----|----|----|------|
| 1  | 1  | 1  | 3    |
| 1  | 1  | −1 | 1    |
| 1  | −1 | 1  | 1    |
| 1  | −1 | −1 | −1   |

TABLE I-continued

| f1 | f2 | f3 | fsum |
|----|----|----|------|
| −1 | 1  | 1  | 1    |
| −1 | 1  | −1 | −1   |
| −1 | −1 | 1  | −1   |
| −1 | −1 | −1 | −3   |

The absolute value of fsum is advantageously normalized by dividing by 3 and then raised to the Z power to give the term FAC.

$$FAC = (\text{ABS}(fsum)/3)^z \quad (6)$$

It should be mentioned that the value of Z is selected based on how much noise suppression is required at steady-state. Stated another way, the basic N-sign filter can be thought of as a low-pass filter with two possible values of FIL: one for response to signal changes (e.g. fsum equals 3), FIL1, and one for steady-state noise suppression (e.g. fsum equals 1), FIL2. See TABLE II, below.

$$FIL1 = FIL*(1)^z \quad (10)$$

$$FIL2 = FIL*(\tfrac{1}{3})^z \quad (11)$$

TABLE II

| Z  | FIL1 | FIL2    | FAC     |
|----|------|---------|---------|
| 1  | 0.5  | 0.1667  | 0.3333  |
| 2  | 0.5  | 0.0556  | 0.1111  |
| 3  | 0.5  | 0.0185  | 0.0370  |
| 4  | 0.5  | 0.0062  | 0.0123  |
| 5  | 0.5  | 0.0021  | 0.0041  |
| 10 | 0.5  | 8.47E-6 | 1.69E-5 |

Figure 15A:
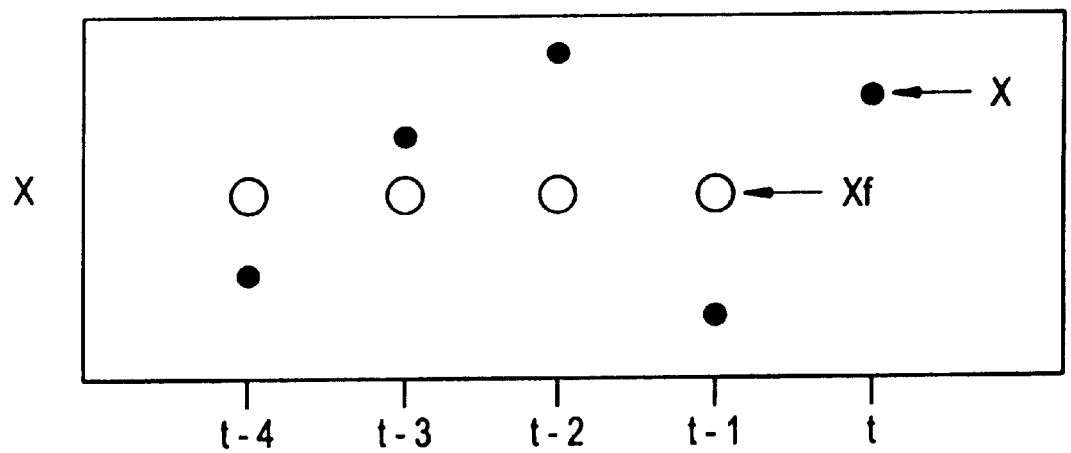
FIGS. 15A–15D are data representations which are useful in understanding the basic N-sign filther operation according to the present invention.
Figure 15B:
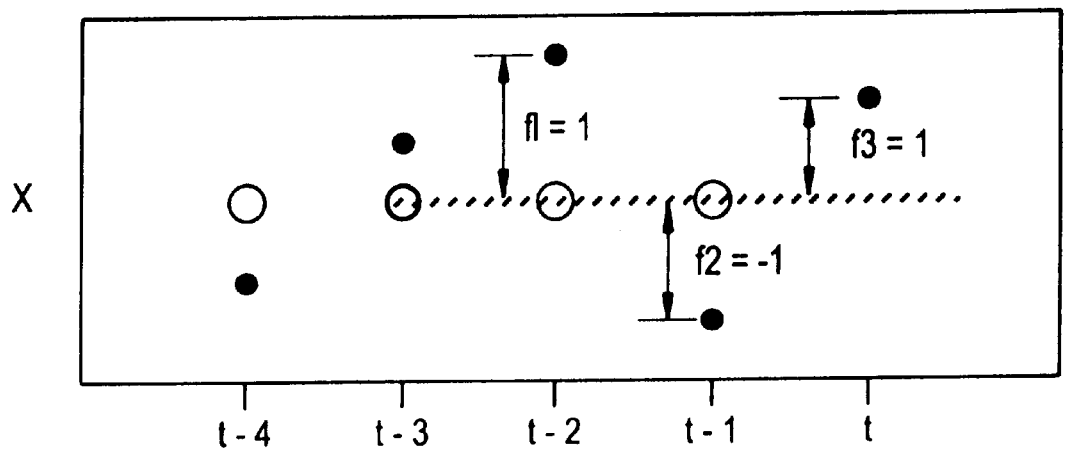

The operation of the N-sign filter, with N set equal to three, according to the present invention can best be understood by referring to the following discussion while viewing FIGS. 15A–15D. FIG. 15A, for example, shows the raw data points—denoted X, and the filtered signal—denoted Xf. A new value of X(t) has just been registered, i.e., received, and the corresponding value of Xf(t) needs to be calculated. In FIG. 15B, the point Xf(t−3) is the reference for determining the values f1, f2, and f3, since the point Xf(t−3) is the last point which is not influenced by the latest three raw data points. These differences are summed to give fsum=1, and $FAC = (\tfrac{1}{3})^z$. At this juncture, the value of FAC has been determined, with FIL being an input.

Stated another way, in order to determine the new value of Xf(t), first the "f" terms are assigned for the last three raw values of X depending on whether the deltas, i.e., differences, between these points and the filtered value at Xf(t−3) are positive or negative. Note that Xf(t−2) and Xf(t−1) in FIG. 15B do not enter into the calculation. The value of FAC is thus determined according to the expression:

$$FAC = \left(\frac{\text{ABS}(f1 + f2 + f3)}{3}\right)^z$$
$$= (1/3)^z \text{ e.g., } Z = 4: FAC = 0.0123$$

Figure 15C:
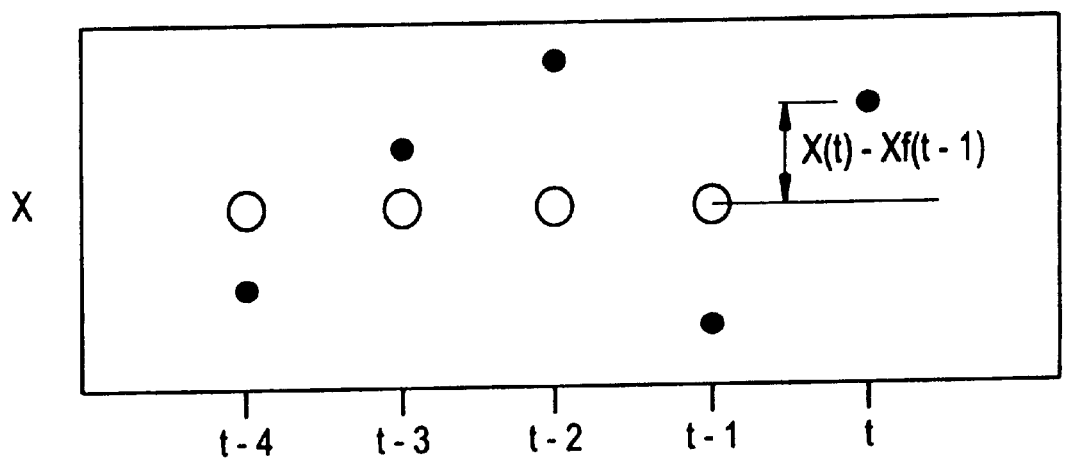

It will be appreciated that Xf(t−3) was used as the point of reference for determining whether X(t) represents a true signal shift or just noise. It will also be appreciated that the reference point for calculating Xf(t), however, is Xf(t−1), as shown in FIG. 15C. Thus, after determining the value of FAC, the value of Xf(t) is calculated using the expression:

Xf(t)=Xf(t−1)+FIL*FAC*(X(t)−Xf(t−1))

Figure 15D:
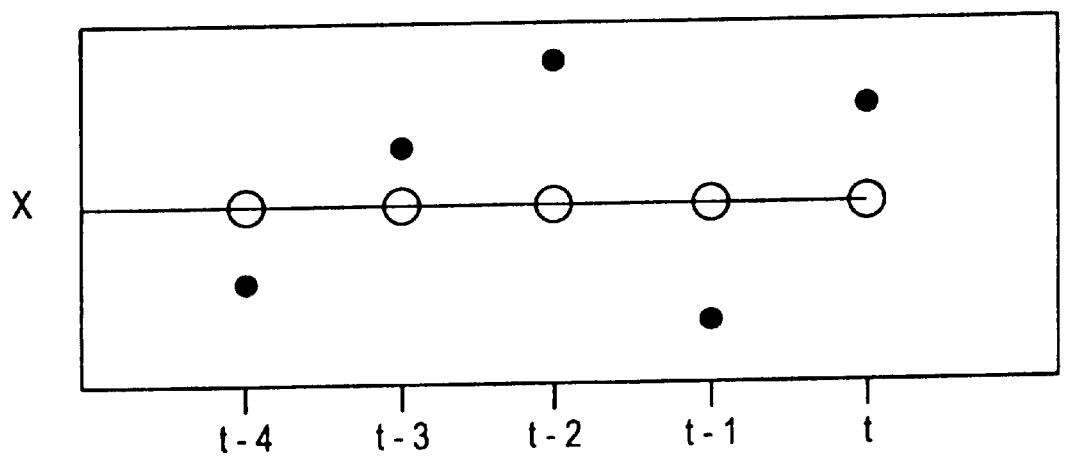

Since the value of FAC is so small, almost no change is made relative to Xf(t−1) regardless of the value of FIL unless the difference X(t)−Xf(t−1) is very large. For the exemplary case being discussed, with FIL=0.5 and Z=4, FIL*FAC=0.00615, it will be appreciated that Xf(t) moves less than 1% of the distance toward X(t). This is shown in FIG. 15D, where the bold line represents the filtered "signal" seen by the Horizon controller. It will be appreciated that even though there is considerable noise in the raw data signals, the signal Xf is very steady. It should be noted that this permits the steady-state calculation of the horizon controller to be much more stable without limiting the horizon controller's ability to adapt to a true upset or change in the applied set-point. In contrast, it will be noted that a low-pass filter with a value of FIL=0.5 would have moved 50% of the distance between Xf(t−1) and X(t). It will be appreciated that the development of N-sign filters, where N is set to either 4 or 5, advantageously can be extrapolated for all values of N using the discussion above as a basis.

Modified N-sign Filters

Figure 16A:
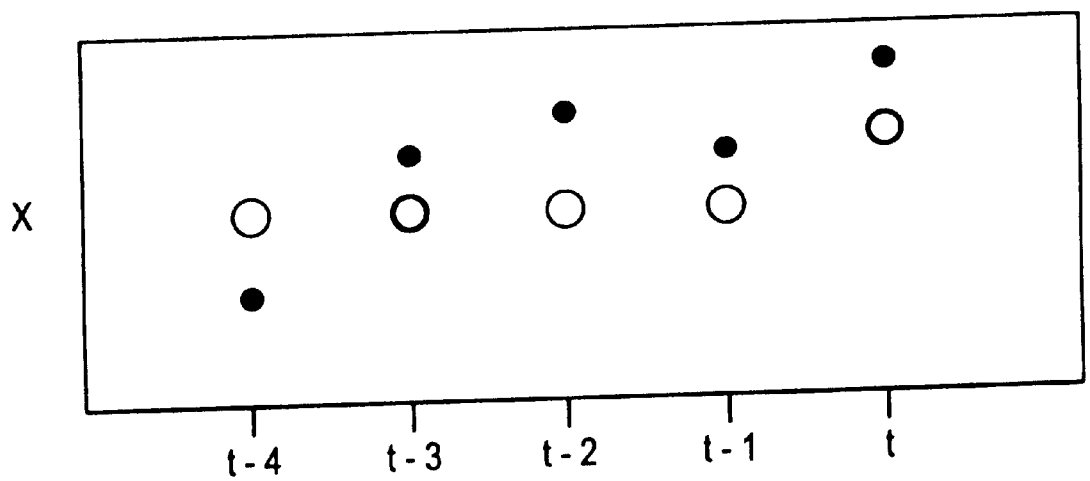
FIGS. 16A–16D are data representations which are useful in understanding an alternative N-sign filter operation according to another preferred embodiment of the present invention.
Figure 16B:
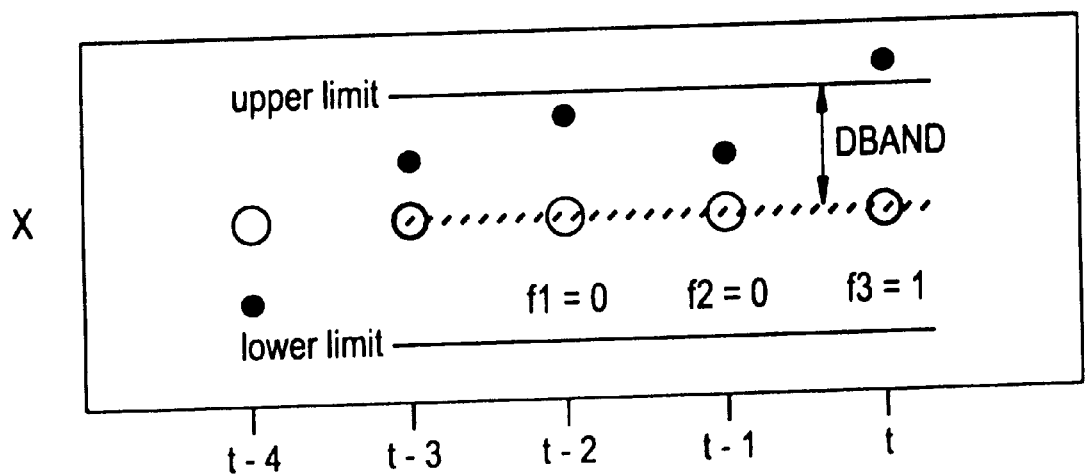

For a noisy signal, the probability of getting three raw data points on the same side of Xf(t−3) is good. Using the basic N-sign filter, this will result in occasional moves up and down in Xf(t) when no move is called for, as shown in FIG. 16A. However, the likelihood of this phenomenon can be greatly reduced by adding a dead-band around the reference point Xf(t−3) in which the value of the "f" terms is 0 instead of +1 or −1, as illustrated in greater detail in FIG. 16B. It will be appreciated from inspection of FIG. 16B that since two of the raw data points lie within this band, the value of FAC will be very small, resulting in almost no change to Xf(t) relative to Xf(t−1).

f3=SIGN[X(t)−Xf(t−3)]*FACTOR3     (12)

f2=SIGN[X(t−1)−Xf(t−3)]*FACTOR2     (13)

f1=SIGN[X(t−2)−Xf(t−3)]*FACTOR1     (14)

Figure 16C:
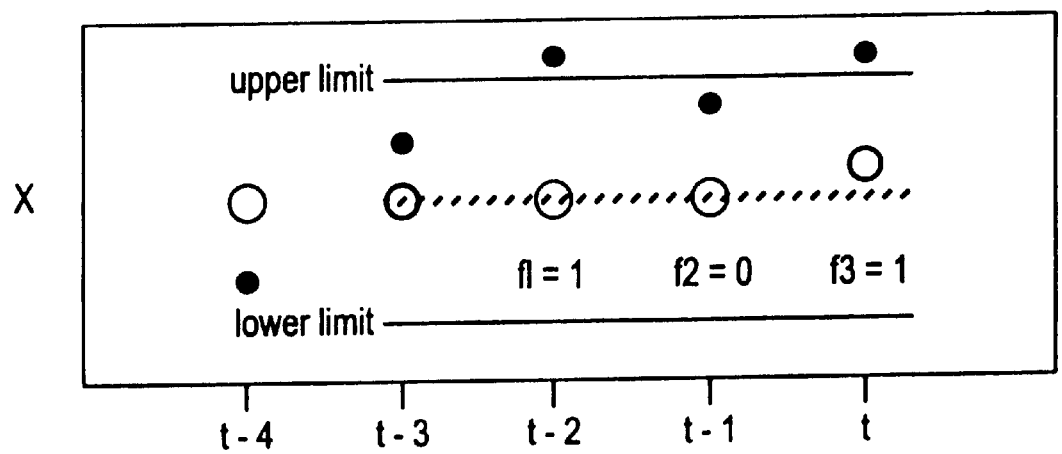

Advantageously, the "FACTOR" terms can be calculated in many different ways to customize the behavior of the signal. The simplest way to calculate these terms is to allow FACTOR only the discrete values of 0 inside the dead-band and 1 outside of it, as shown in FIG. 16C. In the exemplary case illustrated in FIG. 16C, two of the three points lie out of the dead-band, so the value of FAC is no longer negligible. For the three values of X shown in FIG. 16C, moving Xf(t) upward seems the appropriate step. If, however, X(t−1) had fallen below the value of Xf(t−3), it would seem wiser not to move Xf(t). This is accomplished as discussed in greater detail below.

Referring to FIG. 16C, FACTOR3 could be calculated as follows, with FACTOR2 and FACTOR1 being found analogously.

if ABS[X(t)−Xf(t−3)]>DBAND then FACTOR3=1     (15)

else FACTOR3=0     (16)

Figure 16D:
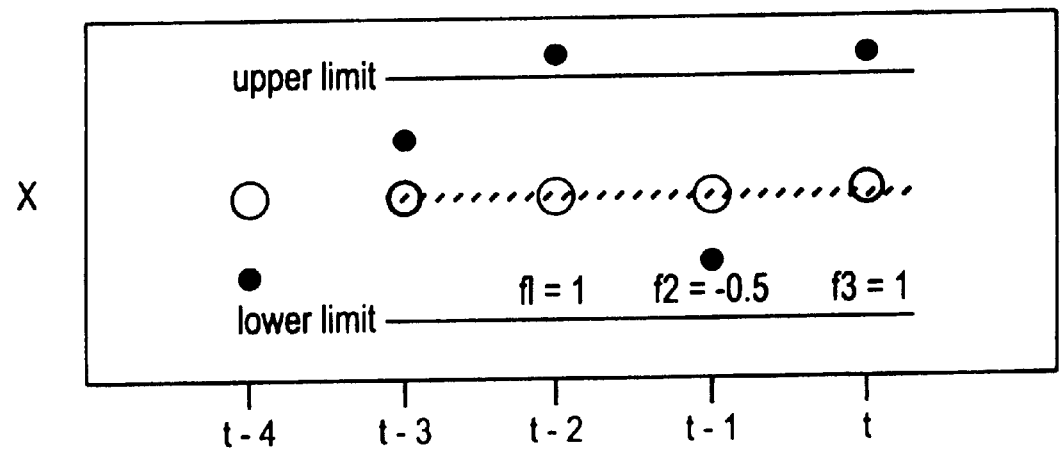

A more sophisticated method is to allow FACTORi to assume the range of values between 0 and 1. This is shown in FIG. 16D, wherein:

if ABS[X(t)−Xf(t−3)]>DBAND then FACTOR3=1     (17)

else $FACTOR3 = \left(\frac{ABS[X(t) - Xf(t-3)]}{DBAND}\right)$     (18)

It should be mentioned at this point that the same effect can be accomplished in one line by using the intrinsic function MIN, which takes the smallest of a list of numbers. An exemplary expression is presented immediately below.

$FACTOR3 = MIN\left(1, \frac{ABS[X(t) - Xf(t-3)]}{DBAND}\right)$     (19)

Advantageously, fsum can now take on a continuum of values from −3 to 3. As will be discussed in greater detail below, this allows the N-sign filter to gradually eliminate offsets.

Preferably, the modified N-sign filter, with N=4, can be constructed either as a stand alone unit or using a general purpose controller, e.g., the horizon controller employing the NMPC method according to the present invention to perform the algorithm set forth in Equations (20)–(31), which are presented immediately below. It should again be mentioned that in the equations which follow X(t)=raw data point at time t and Xf(t)=filtered signal at time t.

$FACTOR4 = MIN\left(1, \frac{ABS[X(t) - Xf(t-4)]}{DBAND}\right)$     (20)

$FACTOR3 = MIN\left(1, \frac{ABS[X(t-1) - Xf(t-4)]}{DBAND}\right)$     (21)

$FACTOR2 = MIN\left(1, \frac{ABS[X(t-2) - Xf(t-4)]}{DBAND}\right)$     (22)

$FACTOR1 = MIN\left(1, \frac{ABS[X(t-3) - Xf(t-4)]}{DBAND}\right)$     (23)

f4=SIGN[X(t)−Xf(t−4)]*FACTOR4     (24)

f3=SIGN[X(t−1)−Xf(t−4)]*FACTOR3     (25)

f2=SIGN[X(t−2)−Xf(t−4)]*FACTOR2     (26)

f1=SIGN[X(t−3)−Xf(t−4)]*FACTOR1     (27)

fsum=INT (ABS(f1+f2+f3+f4))     (28)

$FAC = \left(\frac{ABS(fsum)}{4}\right)^z$     (29)

$XS(t) = \frac{X(t) + X(t-1) + X(t-2) + X(t-3)}{4}$     (30)

Xf(t)=Xf(t−1)+FIL*FAC*{XS(t)−Xf(t−1)}     (31)

Moreover, the modified N-sign filter for N=5 can be constructed either as a stand alone unit or using a general purpose controller, e.g., the horizon controller employing the NMPC method according to the present invention to perform the algorithm set forth in Equations (32)–(45), which are presented immediately below. It should again be mentioned that in the equations which follow X(t)=raw data point at time t and Xf(t)=filtered signal at time t.

$$FACTOR5 = \text{MIN}\left(1, \frac{\text{ABS}[X(t) - Xf(t-5)]}{DBAND}\right) \quad (32)$$

$$FACTOR4 = \text{MIN}\left(1, \frac{\text{ABS}[X(t-1) - Xf(t-5)]}{DBAND}\right) \quad (33)$$

$$FACTOR3 = \text{MIN}\left(1, \frac{\text{ABS}[X(t-2) - Xf(t-5)]}{DBAND}\right) \quad (34)$$

$$FACTOR2 = \text{MIN}\left(1, \frac{\text{ABS}[X(t-3) - Xf(t-5)]}{DBAND}\right) \quad (35)$$

$$FACTOR1 = \text{MIN}\left(1, \frac{\text{ABS}[X(t-4) - Xf(t-5)]}{DBAND}\right) \quad (36)$$

f5=SIGN[X(t)-Xf(t-5)]*FACTOR5 (37)

f4=SIGN[X(t-1)-Xf(t-5)]*FACTOR4 (38)

f3=SIGN[X(t-2)-Xf(t-5)]*FACTOR3 (38)

f2=SIGN[X(t-3)-Xf(t-5)]*FACTOR2 (40)

f1=SIGN[X(t-4)-Xf(t-5)]*FACTOR1 (41)

fsum=INT(ABS(f1+f2+f3+f4+f5)) (42)

$$FAC = \left(\frac{\text{ABS}(fsum)}{5}\right)^z \quad (43)$$

$$XS(t) = \frac{X(t) + X(t-1) + X(t-2) + X(t-3) + X(t-4)}{5} \quad (44)$$

f(t)=Xf(t-1)+FIL*FAC*{XS(t)-Xf(t-1)} (45)

A further refinement to the N-sign filter is to increase the penalty for any raw data point on the opposite side of Xf(t-3) from the other two raw data point. This advantageously can be performed by truncating the value of fsum (shown below with the FORTRAN intrinsic function INT).

fsum'=INT (ABS(fsum)) (46)

for example:

f1=1, f2=-0.5, f3=1 fsum=1.5 but fsum'=INT(1.5)=1.0

Figure 17:
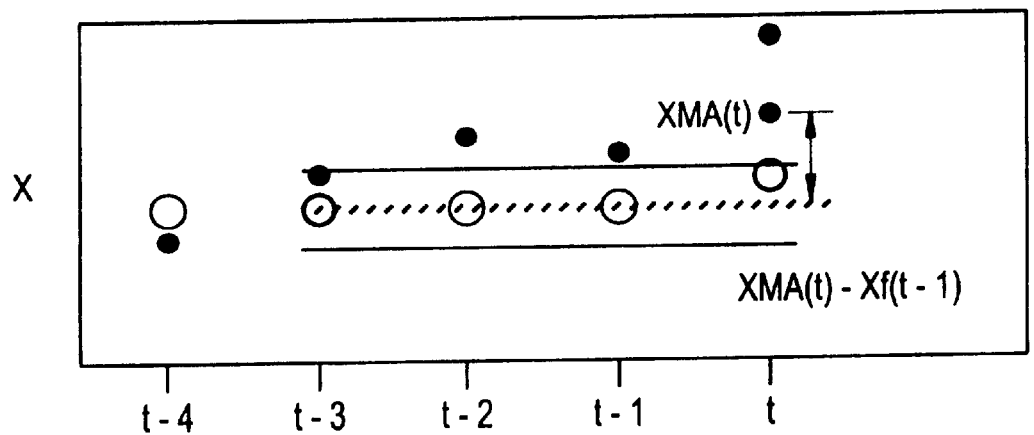
FIG. 17 illustrates the use of an alternative calculation method which advantageously can be used with the N-sign filter or the present invention.

Up to this point, the focus of the discussion was with respect to improved methods by which the term FAC can be calculated. Assuming that FAC=1, adjustments to the filtered signal based on the difference {X(t)-Xf(t-1)} can be performed. However, for a noisy signal, this difference contains all the noise of the value of X(t). The filtered signal Xf(t) advantageously can be smoothed a little by calculating a moving average value XS(t) and using the moving average in determining Xf(t), as shown in FIG. 17. Advantageously, other forms of smoothing the raw signal can also be employed. In the example shown in FIG. 17, three consecutive points lie above the dead-band, so FAC=1, however, the last point is quite a bit higher than the other two raw data points. This represents the situation immediately following a shift upwards of the true signal at t-2. On average, all points are above the dead-band, with some being much higher due to noise. In order not to act on the noise, the calculation of Xf(t) is performed based on the difference between Xf(t-1) and the moving average of the last 3 values of X, i.e., XS(t), rather than simply using the value of X(t).

$$XS(t) = \frac{X(t) + X(t-1) + X(t-2)}{3} \quad (47)$$

Xf(t)=Xf(t-1)+FIL*FAC*{XS(t)-Xf(t-1)} (48)

It will be appreciated that this will add an additional slight delay, which advantageously can be negated by increasing the value of FIL.

Thus, an alternative preferred embodiment of the N-sign filter can be constructed either as a stand alone unit or using a general purpose controller, e.g., the horizon controller employing the NMPC method according to the present invention to perform the algorithm set forth in Equations (49)–(60), which are presented immediately below. It should again be mentioned that in the equations which follow X(t)=raw data point at time t and Xf(t)=filtered signal at time t. Preferably, the N-sign filter algorithm is performed as a series of steps as set forth below.

(1) Calculate n FACTOR values according the expressions (49)–(52):

$$FACTORn = \text{MIN}\left(1, \frac{\text{ABS}[X(t) - Xf(t-n)]}{DBAND}\right) \quad (49)$$

$$FACTORn-1 = \text{MIN}\left(1, \frac{\text{ABS}[X(t-1) - Xf(t-n)]}{DBAND}\right) \quad (50)$$

$$FACTORn-2 = \text{MIN}\left(1, \frac{\text{ABS}[X(t-2) - Xf(t-n)]}{DBAND}\right) \quad (51)$$

$$\downarrow \qquad \downarrow$$

$$FACTOR1 = \text{MIN}\left(1, \frac{\text{ABS}[X(t-n+3) - Xf(t-n)]}{DBAND}\right) \quad (52)$$

(2) Calculate n f values according the expressions (53)–(56):

fn=SIGN[X(t)-Xf(t-n)]*FACTORn (53)

fn-1=SIGN[X(t-1)-Xf(t-n)]*FACTORn-1 (54)

$$fn-2 = \text{SIGN}[X(t-2) - Xf(t-n)] * FACTORn-2 \quad (55)$$

$$\downarrow \qquad \downarrow \qquad \downarrow$$

$$f1 = \text{SIGN}[X(t-n+1) - Xf(t-n)] * FACTOR1 \quad (56)$$

(3) Calculate fsum according to the expression (57):

fsum=ABS(f1+f2+f3+ . . . +fn) (57)

(4) Calculate FAC according to the expression (58):

FAC=([ABS(fsum)]/n)$^z$ (58)

(5) Calculate the smoothed value XS(t) according to the expression (59):

$$XS(t) = \frac{X(t) + X(t-1) + X(t-2) + \ldots + X(t-n+1)}{n} \quad (59)$$

(6) Calculate the filtered value Xf(t) according to the expression (60):

Xf(t)=Xf(t-1)+FIL*FAC*{XS(t)-Xf(t-1)} (60)

Preferably, the algorithm presented immediately above employs the following recommended values:

(A) DBAND should be greater than the magnitude of the noise. Therefore, if at steady-state, X(t) varies between Xf(t−3)+Noise and Xf(t−3)−Noise, DBAND should be slightly larger than Noise. It will be appreciated that the Noise term is expressed in terms of a percentage or fixed value of the sensed variable.

(B) Although Z can be any positive number, Z advantageously can be in the range of about 1–10, and preferably is in the range of 3–5. It will be appreciated that if Z is too small, then (⅓)**Z is not insignificant, and the filtered signal will fluctuate some in response to noise. In contrast, when Z is too large, the movement of the filtered signal is reduced to all or nothing, which is acceptable with respect to dramatic signal moves, but will tend to accentuate the step-like nature of the N-sign filter in response to ramping signals. In other words, the N-sign filter output can be represented by a few larger steps.

(C) FIL preferably should be set such that the response to true signal moves is as fast as required. For a horizon controller executing approximately once per minute, a value of 0.5 is probably appropriate.

Alternatively, the expression (57) used in calculating fsum can be replaced by the expression (61)

$$fsum=INT(ABS(f1+f2+f3+ \ldots +fn)) \quad (61)$$

when an integer representation of fsum advantageously can be employed.

In summary, a digital signal filter has been developed which satisfies two seemingly mutually exclusive criteria: it provides a very smooth signal at steady-state, yet it is also quick to respond to a change. This makes it ideal for the smoothing of signals used by a horizon controller.

Figure 18A:
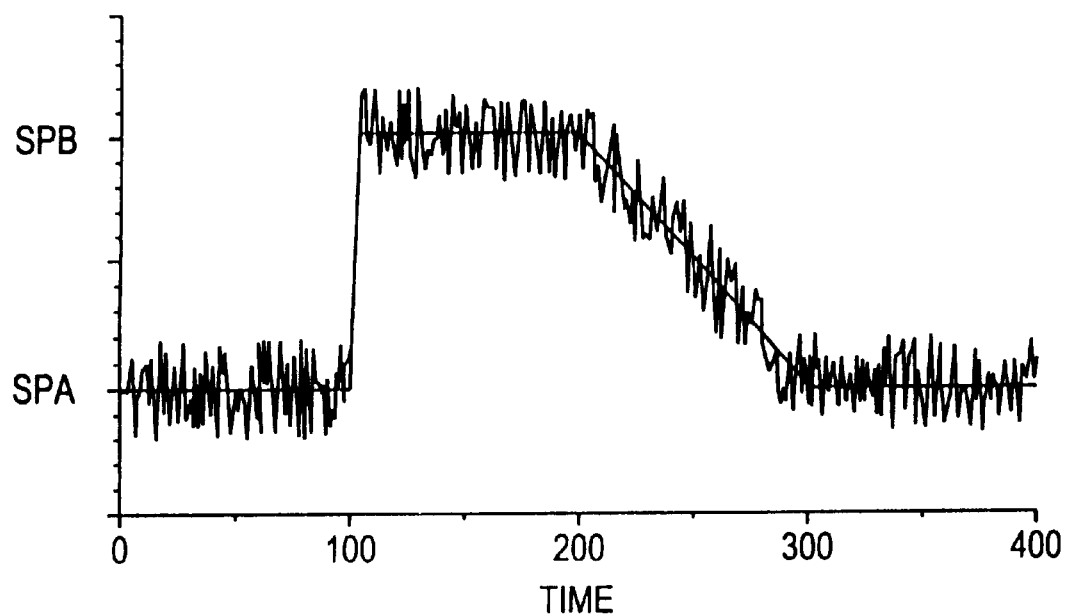
FIGS. 18A–18K illustrate various output signals which are useful in understanding the operation of the various N-sign filter embodiments according to the present invention.

FIG. 18A shows the exemplary signal that was used in all the tests of the N-sign filter. While the N-sign filter described can be used on any signal, the production rate was used as the test case so that the effect of smoothing the signal has on the density horizon controller can readily be illustrated. The true signal starts at SPA Kg/hr, rises within 5 minutes to SPB Kg/hr as it might with the sudden addition of H2 or C2, levels off for 100 minutes, and then drops slowly back to SPA Kg/hr over the course of 100 minutes as it might in response to a cut back in the catalyst feed. In this way, the test signal shows the three kinds of behavior that we must use to evaluate our filtering methods: steady-state, sudden change, and slow drift. Superimposed on the "true" signal in FIG. 18A is the "measured" signal, which in this case includes noise with a maximum magnitude of 200 Kg/hr. This "measured" signal is what will be fed to the filters to determine their ability to provide a smooth yet responsive output signal.

Figure 18B:
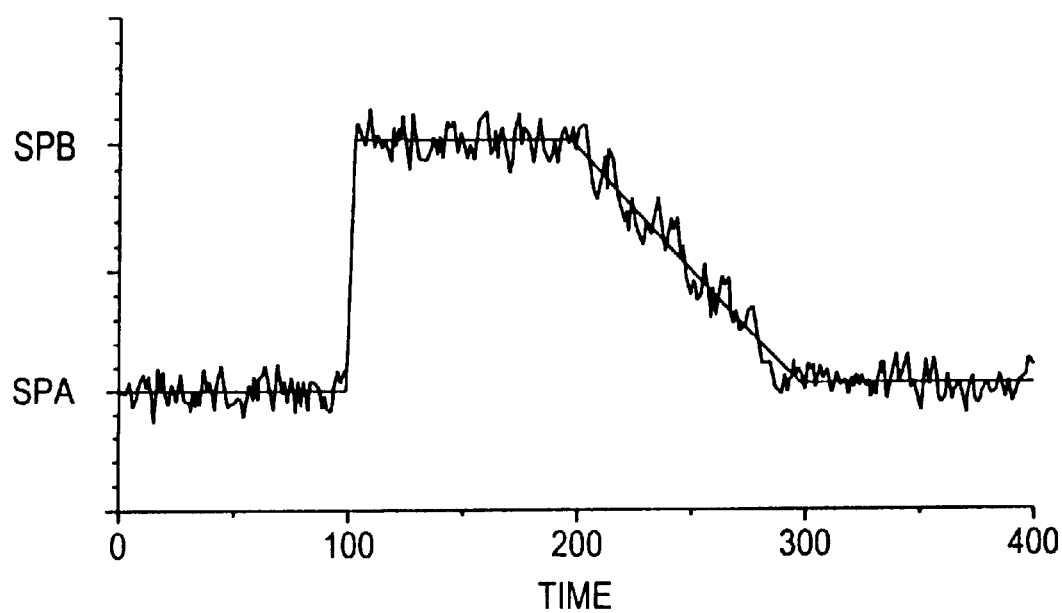
Figure 18C:
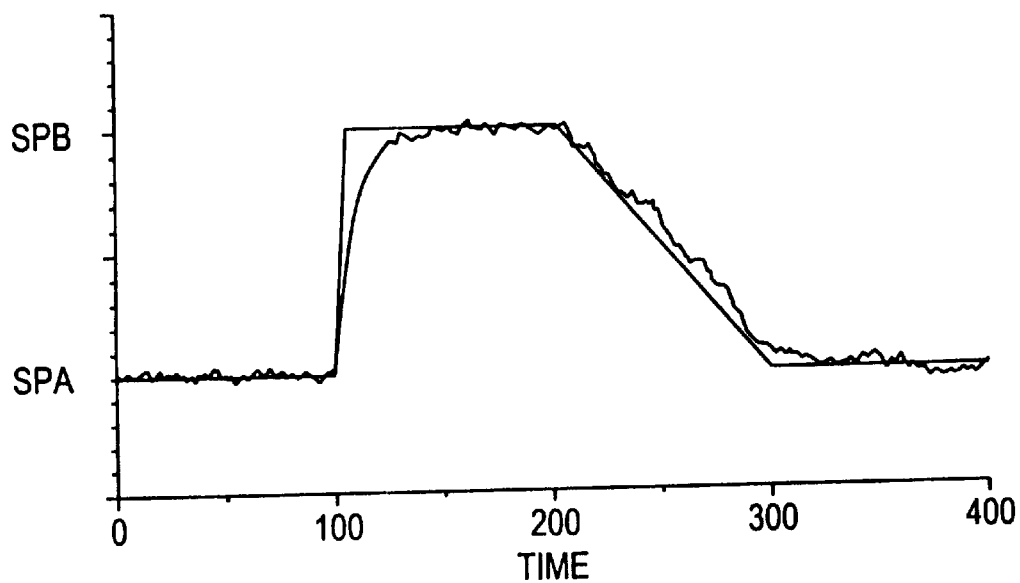

The first filter tested was the standard low-pass filter. FIG. 18B shows the result of FIL=0.5. All the noise of the original signal is still present in the smoothed signal, the only difference is that its magnitude has been cut in half. It will be noted that it was desired to cut the amplitude of the noise to +/−20 Kg/hr, this would require FIL=0.1, which is the case shown in FIG. 18C. It will be appreciated that the output of the low-pass filter illustrated in FIG. 18C depicts as acceptably smooth steady-state signal, but at the cost of a very slow response to any change in the underlying signal, as evidenced by the need for more than 25 minutes for the filtered signal to reach SPB Kg/hr. It should be mentioned that the benefit derived from the use of horizon controllers, makes this delayed signal clearly unacceptable. It will also be appreciated that it was exactly the situation illustrated in FIG. 18C which motivated the search for a better way to smooth the steady-state.

Figure 18D:
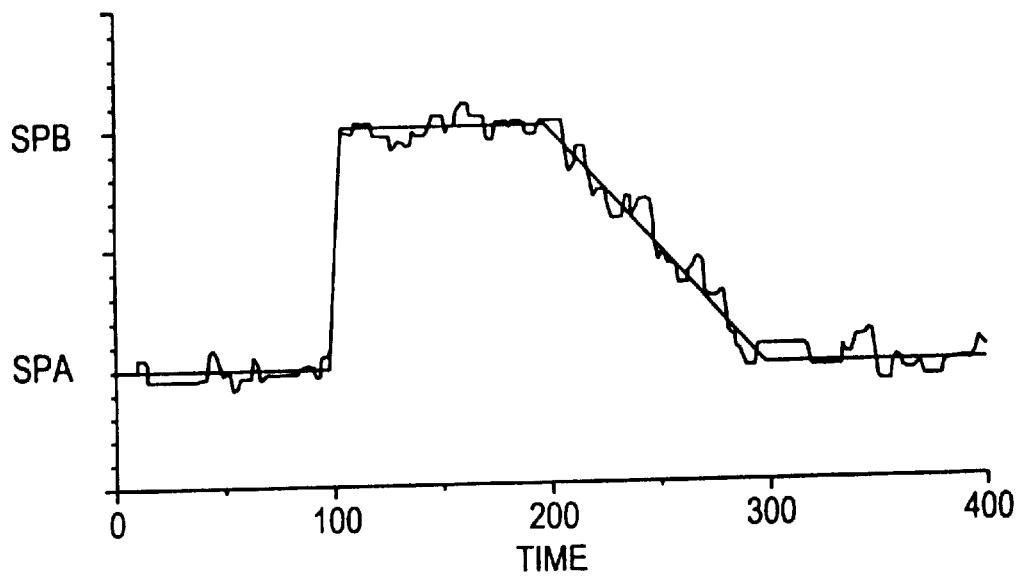

It should be mentioned that since the N-sign filter responds like a low-pass filter to a step change, all of the tests of the N-sign filter will be conducted with FIL=0.5. The basic N-sign filter response is shown in FIG. 18D, which clearly is an improvement over the low-pass filter. However, the N-sign filter response illustrated in FIG. 18D it is still noisy due primarily to the occasions when three consecutive fluctuations of noise are in the same direction, i.e., are on one side of the point Xf(t−3).

Figure 18E:
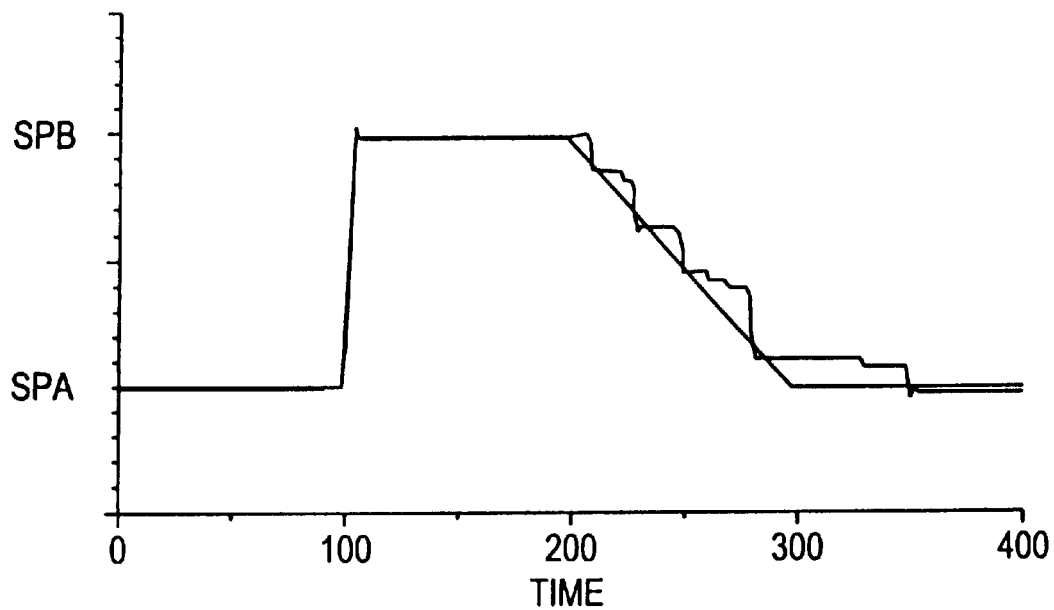

FIG. 18E shows how markedly the N-sign filter is improved with the addition of a dead-band with a half-width of 200 Kg/hr. There is now virtually no movement of the filtered signal at steady-state, and the response to a step change is very good. It will be noted that there is a price to pay for the steady-state response, the price being the stair-step quality of the response to a slow drift in the setpoint and the tendency for an offset to persist afterwards. The discrete nature of the stair-step might cause problems for a conventional PID feedback controller with derivative action, but then such a controller would require a very small value of FIL for a conventional low-pass filter anyway, and the problem could be avoided by lowering the value of FIL for the N-sign filter. For the model-based horizon controller, i.e., the NMPC method, these steps present no problem at all.

Figure 18F:
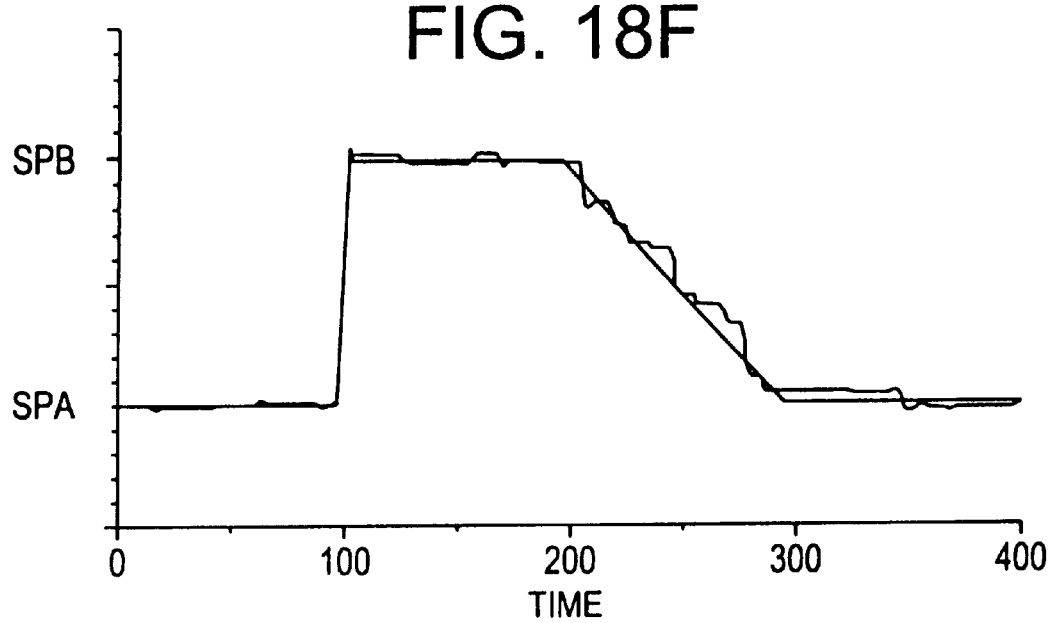
Figure 18G:
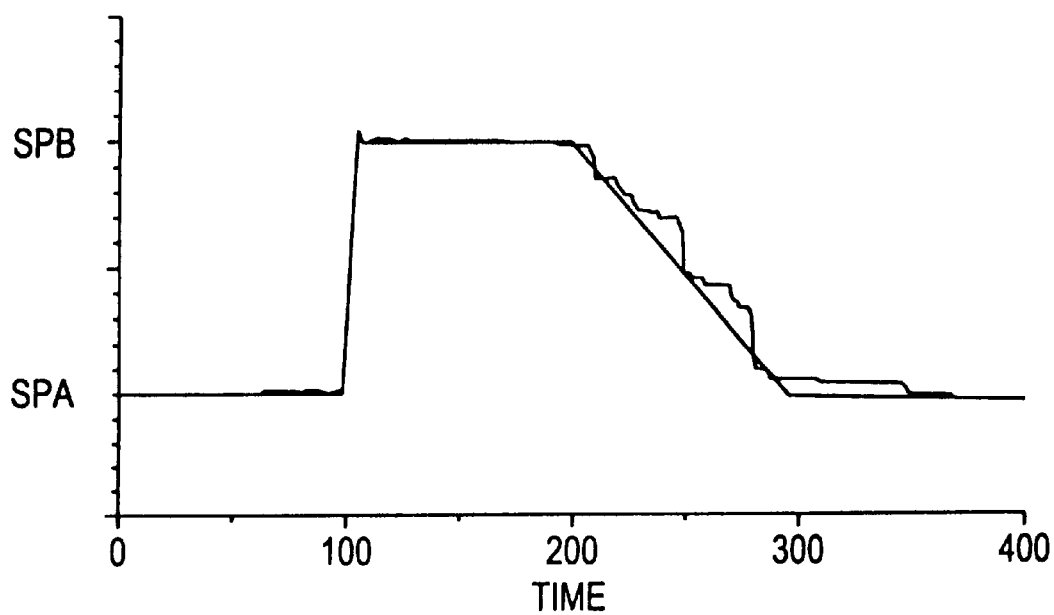
Figure 18H:
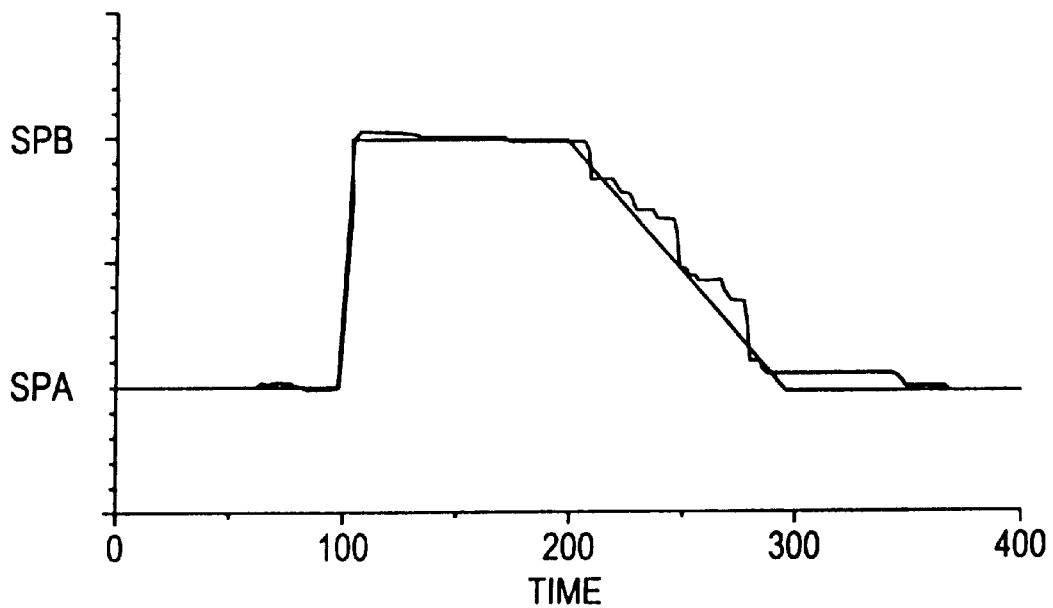

In all probability, the signal given by the N-sign filter with dead-band illustrated in FIG. 18E is clean enough for use with the horizon control method according to the present invention. However, as discussed immediately above, some minor improvements are not only possible but practical. The effect of these improvements are discussed with respect to FIGS. 18F–18H. More specifically, FIG. 18F shows the result of modifying the dead-band to allow continuous values of the "FACTOR" terms from 0 to 1 (instead of only 0 inside the dead-band and 1 outside of the dead-band). This improves the response to the slow drift, making it smoother, at the expense of a slightly noisier signal at steady-state. The additional noise can be largely eliminated by truncating the value of "fsum" as shown in FIG. 18G. Finally, the rough edges of the filtered signal, such as the spike after the move to SPB Kg/hr, can be smoothed by using a 3 point moving average of the measured values, as shown in FIG. 18H. This does slow the response to the step-change slightly, which can be compensated for by raising the value of FIL.

As already noted, the motivation for this work was to find a method of smoothing the signals used by the horizon controller, whose feed-forward nature makes it respond quickly to true upsets, but also to be more sensitive to noise in the signals it uses for its calculations. In the case of the first loop density horizon controller, the feed-forward value of the monomer feed is given by $$VF1KGSS=(R0+R1)/ZMFPOL1TEFF$$

where R0+R1 is the production rate (prepoly+first loop) from the thermal balance, ZMFPOL1TEFF is the mass fraction of polymer in the loop discharge at target density, and VF1KGSS is the fresh propylene feed required to maintain the target density at steady-state. It should be clear that any noise in the production rate signal, R1, is transmitted directly to the monomer flow set-point.

Figure 18I:
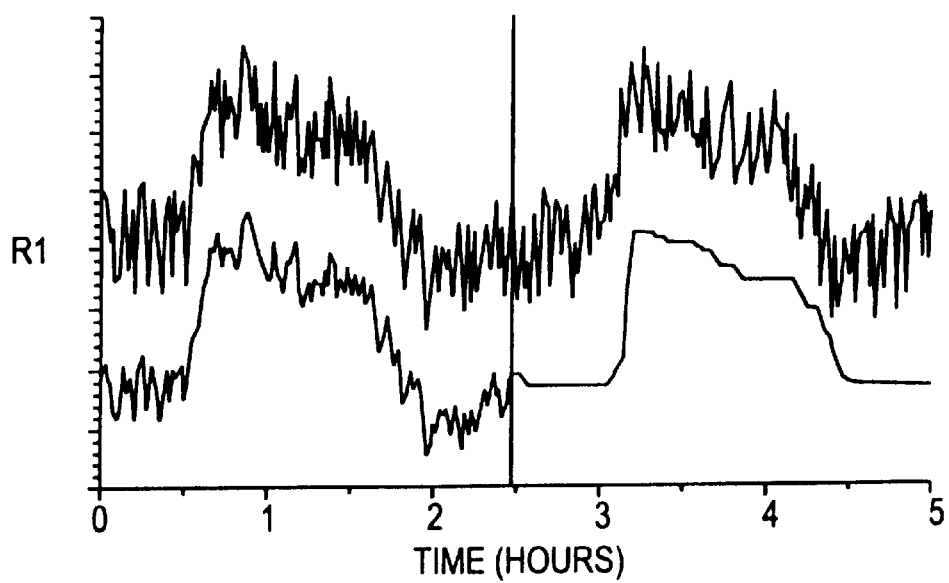
Figure 18J:
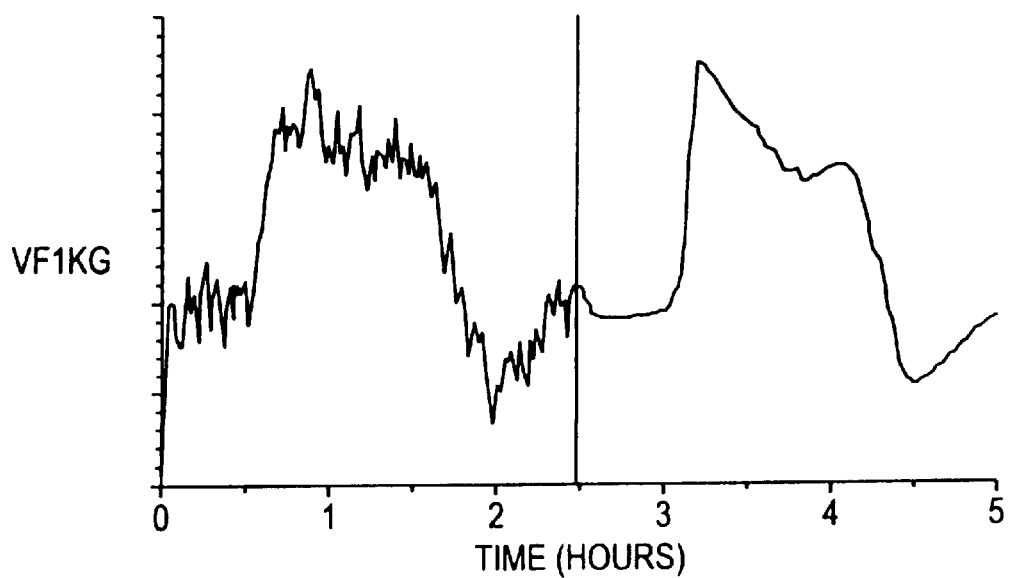

FIG. 18I shows the "measured" value of R1 together with two filtered values: a low-pass filter and an optimized N-sign filter. FIG. 18J contrasts the monomer feed set-point generated from the N-sign filter value of R1 with that using the low-pass signal. The horizon controller using the low-pass value is changing the monomer set-point every minute. This is destabilizing to the other control loops, especially the temperature and pressure drum controllers. Alternatively, the horizon controller using the N-sign filter is very steady, which will have a strong stabilizing effect on the rest of the plant. Yet, it still retains the ability to respond quickly to a true change in the underlying signal.

Figure 18K:
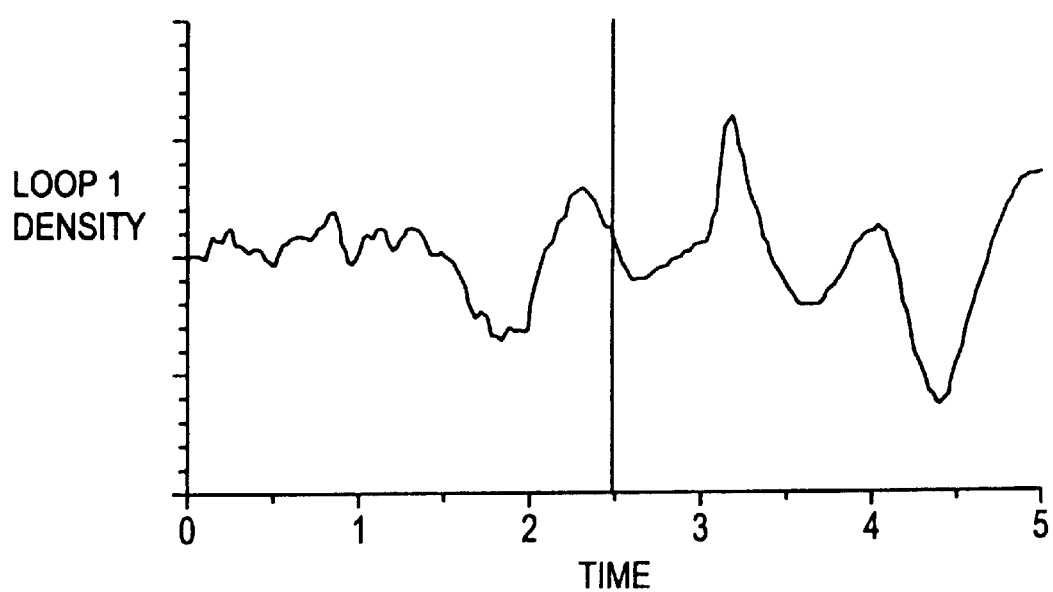

FIG. 18K contrasts the density curve of the controller using the low-pass filter with that using the N-sign filter. In both cases, the control is excellent, maintaining the density within +/−0.7 grams/liter despite a very large swing in the production rate. Ironically, the density is maintained more tightly with large swings in the monomer feed, but this is clearly unacceptable due to the destabilizing effect on the rest of the plant.

The discussion immediately above presented figures showing the progressive improvements to the signal of the N-sign filter as the continuous dead-band, fsum truncation, and N point (e.g. 3) moving average were added to its design, finally resulting in the signal shown in FIG. 18H. It should be mentioned that these test runs were all conducted for 3 raw data points, with Z=4, and dead-band=maximum noise amplitude (200 kg/hr. in these cases). The discussion which follows, which discussion refers to FIGS. 19A–19H, shows the affects of varying each of these parameters so as to demonstrate why it is believed that the values mentioned above represent the optimum configuration for the N-sign filter.

Figure 19A:
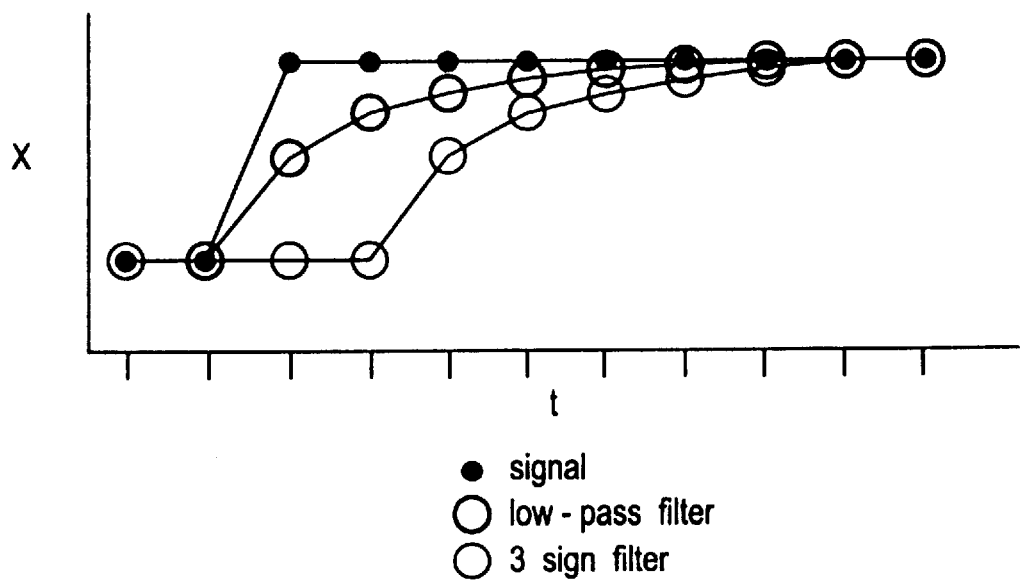
FIGS. 19A–19H are output signals which are useful in depicting the optimization of various parameters employed in the N-sign filter according to tile present invention.
Figure 19B:
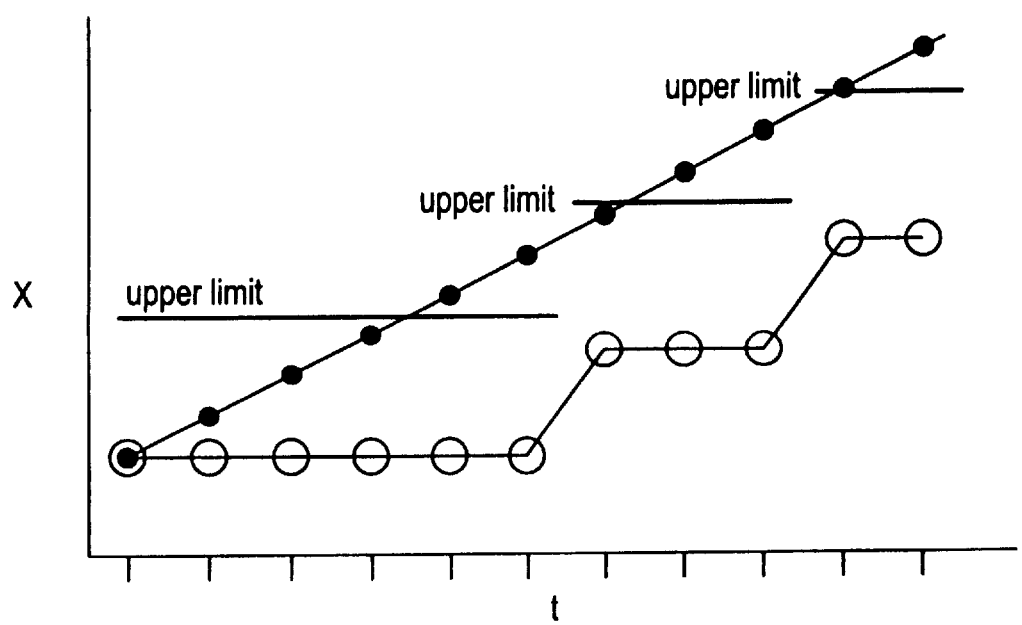

FIG. 19A demonstrates how, in the absence of noise, the signal of the N-sign filter is delayed N-1 time intervals relative to that of a low-pass filter. When a dead-band is added, the response becomes a stair-step since virtually no change is made to the output signal until N points are outside of the dead-band, as shown in FIG. 19B. It should be noted that the time interval used by the N-sign filter can be much smaller than that of the horizon controller that is using the signal and is limited only by the frequency at which the raw data values become available. For example, when the density horizon controller is executing once a minute, the N-sign filter operating at the production rate could easily be updated every 20 seconds. It will be appreciated that this would neutralize the effect of the N-1 interval delay.

Figure 19C:
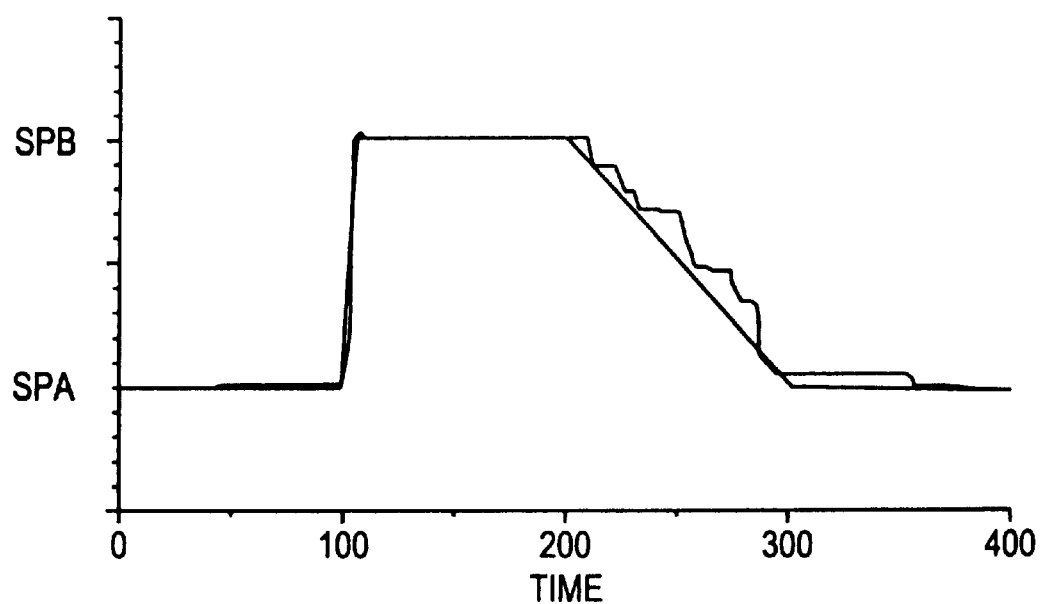
Figure 19D:
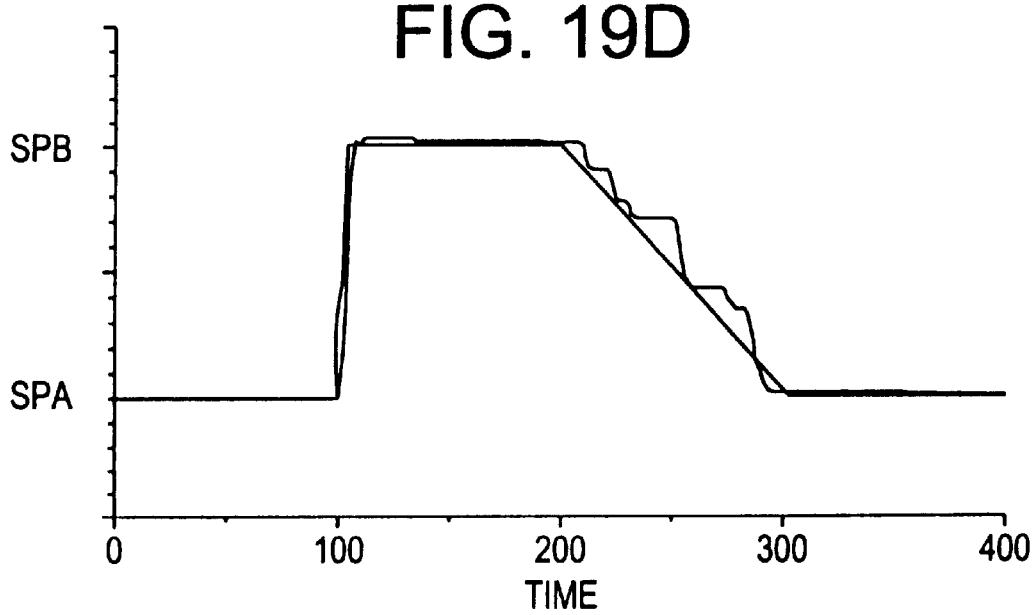

Moreover, the design of the N-sign filter is easily extended to 4, 5, or any other number of points, as discussed in greater detail above. The greater the number of raw data points used in the N sign filter, the smaller the dead-band that advantageously can be used. However, as discussed above, the cost is a longer delay which would require even more frequent execution to eliminate the delay. FIGS. 19C and 19D show the response curves for 4- and 5-sign filters, respectively. It should be noted that while adding points to the basic N-sign filter gives a much smoother signal, the improvement with respect to the modified N-sign filter shown in FIG. 18H is very slight; it is doubtful that the use of additional raw data points is worth the extra effort.

Figure 19E:
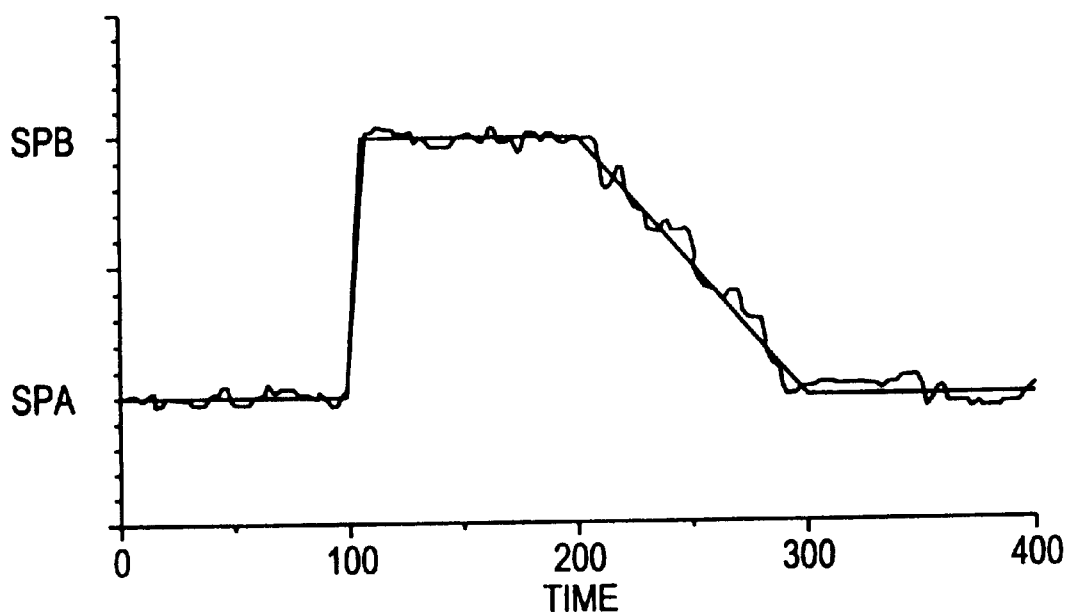
Figure 19F:
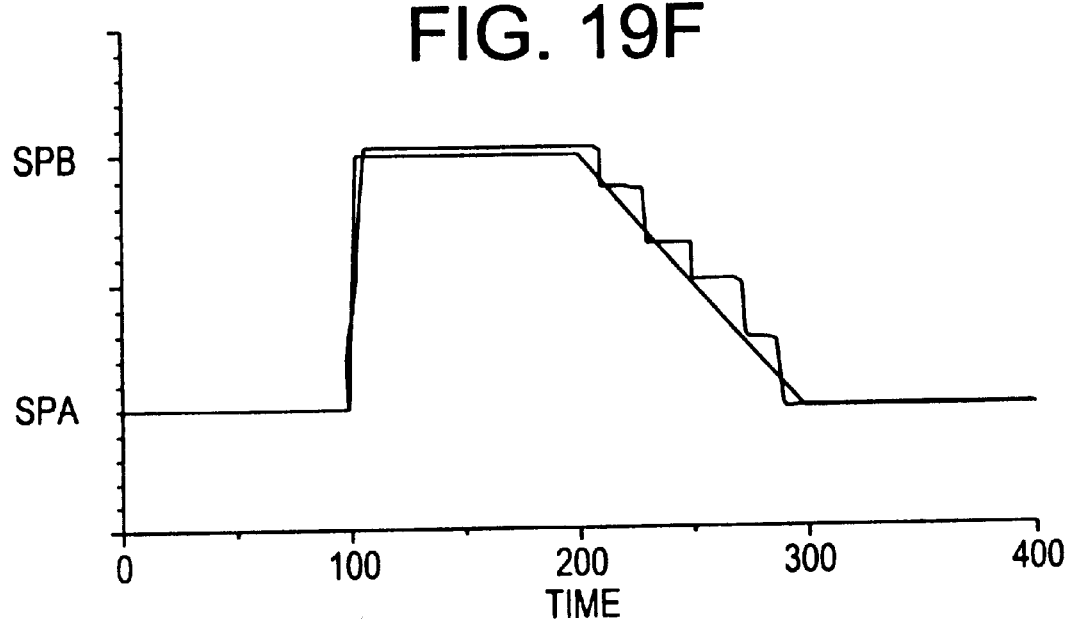

Preferably, the value of Z is adjusted based on how much action is desired when all three points are not outside the dead-band and on the same side, i.e., when fsum<1. FIG. 19E shows the response of a modified N-sign filter with Z=1, which is really very good in comparison with the low-pass filter, the response of which is illustrated in FIG. 18B. It will be appreciated from the earlier discussion that increasing Z smooths out the signal at the expense of more persistent off-sets. In short, it is difficult for the smoothed signal to get closer to the true signal than the dead-band width. Thus, fewer, larger steps are generated by the N-sign filter in response to the ramp, as shown in FIG. 19F for Z=10. A value of Z=4 seems, by inspection, to be optimal as it corresponds to the lowest value that produces a very smooth steady-state signal.

Figure 19G:
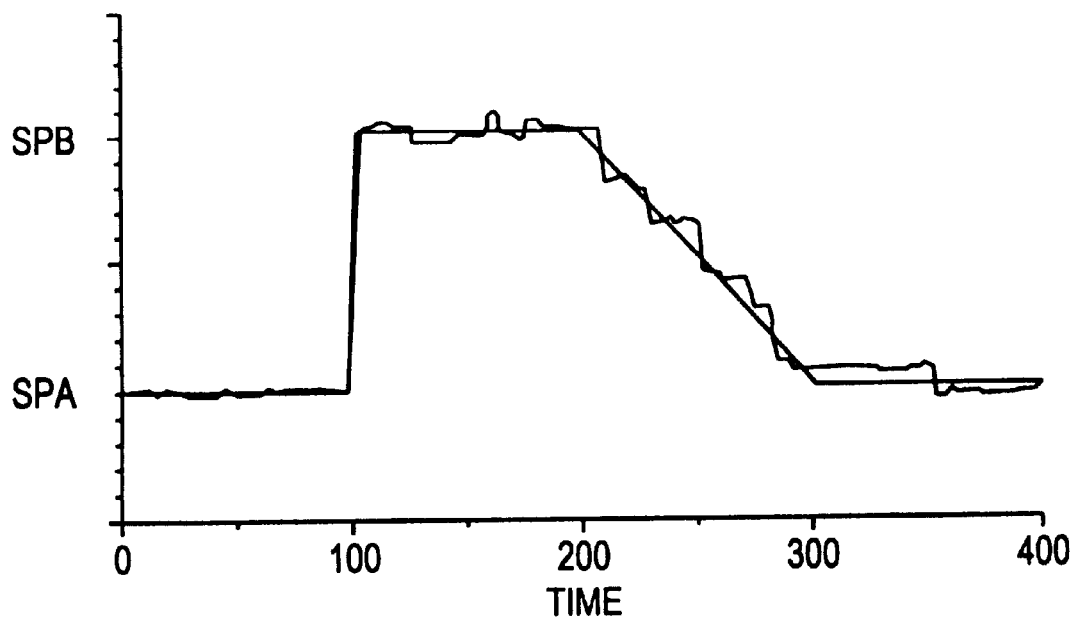
Figure 19H:
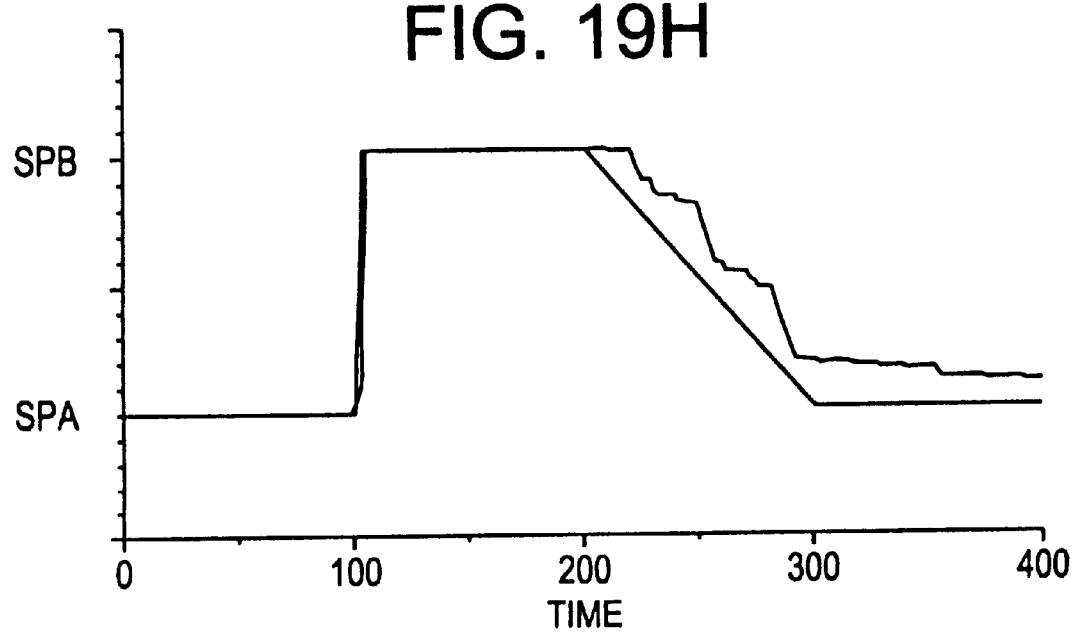

Furthermore, it should be mentioned that the best value for the dead-band is usually going to be roughly equal to the magnitude of the noise in the signal. In all of the examples shown to this point, the maximum signal noise amplitude has been +/−200 kg/hr with a dead-band width of 200 kg/hr also. It is not critical that the dead-band always be equal or larger than the noise component of the signal, as a dead-band of 150 kg/hr (not shown) gives results almost equivalent to those illustrated in FIG. 18H. Setting the dead-band at one-half of the magnitude of the noise is probably too small, as shown in FIG. 19G for dead-band=100 kg/hr. On the other hand, setting the dead-band too wide has even more serious consequences, as shown in FIG. 19H for a dead-band=400 kg/hr. Here, the retardation of the filtered signal to the ramp is almost 30 minutes, which would definitely interfere with the ability of a horizon controller to maintain its set-point. Extrapolating on the data presented in FIGS. 19G and 19H, where the noise in the signal is very severe, it may be necessary to set the dead-band at the maximum value for which the delay is acceptable and tolerate the additional fluctuations in the N-sign filter output.

The discussion above demonstrates how the optimum N-sign filter design for smoothing signals used by a horizon controller was derived and is implemented. It will be appreciated that, in practice, the optimum N-sign filter configuration, i.e., algorithm, will depend on the specifics of the raw signal itself, the characteristics of the horizon controller, and the collateral affects of excessive or slow controller action on the rest of the chemical plant, Thus, while a certain amount of trial and error will undoubtedly be required to optimize the N-sign filter for the specific application, it is believed that such experimentation is well within the skill of one of ordinary skill in the art, particularly given the theory and numerous exemplary algorithms.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for generating a filtered signal from a plurality of raw signals and at least one previously generated filtered signal, the method comprising steps for:

(a) calculating n FACTOR values according the expressions:

$$FACTORn = \text{MIN}\left(1, \frac{ABS[X(t) - Xf(t-n)]}{DBAND}\right)$$

$$FACTORn\text{-}1 = \text{MIN}\left(1, \frac{ABS[X(t-1) - Xf(t-n)]}{DBAND}\right)$$

$$FACTORn\text{-}2 = \text{MIN}\left(1, \frac{ABS[X(t-2) - Xf(t-n)]}{DBAND}\right)$$

$$\downarrow \qquad\qquad\qquad\qquad \downarrow$$

$$FACTOR1 = \text{MIN}\left(1, \frac{ABS[X(t-n+1) - Xf(t-n)]}{DBAND}\right)$$

(b) calculating n f values according to the expressions:

fn=SIGN[X(t)−Xf(t−n)]*FACTORn fn−1=SIGN[X(t−1)−Xf(t−n)]*FACTORn−1

$$fn\text{-}2 = SIGN\,[X(t-2) - Xf(t-n)] * FACTORn\text{-}1$$
$$\downarrow \qquad \downarrow$$
$$f1 = SIGN\,[X(t-n+1) - Xf(t-n)] * FACTOR1$$

(c) calculating fsum according to the expression:

fsum=ABS(f1+f2+f3+ . . . +fn)

(d) calculating FAC according to the expression:

FAC=([ABS(fsum)]/n)$^z$ (e) calculating the smoothed value XS(t) according to the expression:

XS(t)=(a0)X(t)+(a1)X(t-1)+ . . . +(an-1)X(t-(n-1));

and (f) calculating a filtered value Xf(t) according to the expression (60):

Xf(t)=Xf(t-1)+FIL*FAC*{XS(t)-Xf(t-1)}, wherein:
X(t) =raw data point at time t;
Xf(t)=filtered signal at time t;
n is a positive integer;
z is a positive number; and
1=a0+a1+ . . . +an-1.

2. The method according to claim 1, wherein n is equal to 3.

3. The method according to claim 2, wherein said steps (a)–(f) collectively perform the following algorithm:

f3=SIGN[X(t)-Xf(t-3)]*1.0 f2=SIGN[X(t-1)-Xf(t-3)]*1.0 f1=SIGN[X(t-2)-Xf(t-3)]*1.0 fsum=f1+f2+f3

FAC=(ABS(fsum)/3)$^z$

XS(t)=[X(t)+X(t-1)+X(t-2)]/3

Xf(t)=Xf(t-1)+FIL*FAC*{XS(t)-Xf(t-1)}.

4. The method according to claim 1, wherein n is equal to 4 and wherein said steps (a)–(f) collectively perform the following algorithm:

$$FACTOR4 = MIN\left(1, \frac{ABS[X(t) - Xf(t-4)]}{DBAND}\right)$$

$$FACTOR3 = MIN\left(1, \frac{ABS[X(t-1) - Xf(t-4)]}{DBAND}\right)$$

$$FACTOR2 = MIN\left(1, \frac{ABS[X(t-2) - Xf(t-4)]}{DBAND}\right)$$

$$FACTOR1 = MIN\left(1, \frac{ABS[X(t-3) - Xf(t-4)]}{DBAND}\right)$$

f4=SIGN[X(t)-Xf(t-4)]*FACTOR4 f3=SIGN[X(t-1)-Xf(t-4)]*FACTOR3 f2=SIGN[X(t-2)-Xf(t-4)]*FACTOR2 f1=SIGN[X(t-3)-Xf(t-4)]*FACTOR1 fsum=ABS(f1+f2+f3+f4)

FAC=([ABS(fsum)]/4)$^z$

XS(t)=[X(t)+X(t-1)+X(t-2)+X(t-3)]/4

Xf(t)=Xf(t-1)+FIL*FAC*{XS(t)-Xf(t-1)}.

5. The method according to claim 1, wherein n is equal to 5 and wherein said steps collectively perform an algorithm:

$$FACTOR5 = MIN\left(1, \frac{ABS[X(t) - Xf(t-5)]}{DBAND}\right)$$

$$FACTOR4 = MIN\left(1, \frac{ABS[X(t-1) - Xf(t-5)]}{DBAND}\right)$$

$$FACTOR3 = MIN\left(1, \frac{ABS[X(t-2) - Xf(t-5)]}{DBAND}\right)$$

$$FACTOR2 = MIN\left(1, \frac{ABS[X(t-3) - Xf(t-5)]}{DBAND}\right)$$

$$FACTOR1 = MIN\left(1, \frac{ABS[X(t-4) - Xf(t-5)]}{DBAND}\right)$$

f5=SIGN[X(t)-Xf(t-5)]FACTOR5 f4=SIGN[X(t-1)-Xf(t-5)]*FACTOR4 f3=SIGN[X(t-2)-Xf(t-5)]*FACTOR3 f2=SIGN[X(t-3)-Xf(t-5)]*FACTOR2 f1=SIGN[X(t-4)-Xf(t-5)]*FACTOR1 fsum=INT(ABS(f1+f2+f3+f4+f5))

FAC=([ABS(fsum)]/5)$^z$

XS(t)=[X(t)+X(t-1)+X(t-2)+X(t-3)+X(t-4)]/5 and

Xf(t)=Xf(t-1)+FIL*FAC*{XS(t)-Xf(t-1)}.

6. A numerical filter generating a filtered signal from a plurality of raw signals and at least one previously generated filtered signal, comprising:

first means for calculating n FACTOR values according the expressions:

$$FACTORn = MIN\left(1, \frac{ABS[X(t) - Xf(t-n)]}{DBAND}\right)$$

$$FACTORn-1 = MIN\left(1, \frac{ABS[X(t-1) - Xf(t-n)]}{DBAND}\right)$$

$$FACTORn-2 = MIN\left(1, \frac{ABS[X(t-2) - Xf(t-n)]}{DBAND}\right)$$
$$\downarrow \qquad \downarrow$$
$$FACTOR1 = MIN\left(1, \frac{ABS[X(t-n+1) - Xf(t-n)]}{DBAND}\right)$$

second means for calculating n f values according to the expressions:

fn=SIGN[X(t)-Xf(t-n)]*FACTORn fn-1=SIGN[X(t-1)-Xf(t-n)]FACTORn-1

$$fn-2 = SIGN[X(t-2) - Xf(t-n)] * FACTORn-2$$
$$\downarrow \quad \downarrow \quad \quad \downarrow$$
$$f1 = SIGN[X(t-n+1) - Xf(t-n)] * FACTOR1$$

third means for calculating fsum according to the expression:

fsum=ABS(f+f2+f3+ . . . +fn)

fourth means for calculating FAC according to the expression:

FAC=([ABS(fsum)]/n)$^z$ fifth means for calculating the smoothed value XS(t) according to the expression:

XS(t)=(a0)X(t)+(a1)X(t−1)+ . . . +(an−1)X(t−(n−1));

and sixth means for calculating a filtered value Xf(t) according to the expression (60):

Xf(t)=Xf(t−1)+FIL*FAC*{XS(t)−Xf(t−1), wherein:
X(t)=raw data point at time t;
Xf(t)=filtered signal at time t;
n is a positive integer;
z is a positive number; and
1=a0+a1+ . . . +an−1.

7. The numerical filter as recited in claim 6, wherein n is greater than or equal to 2.

8. A numerical filter generating a filtered signal from a plurality of raw signals and at least one previously generated filtered signal, comprising:

first means for calculating n FACTOR values according the expressions:

$$FACTORn = MIN\left(1, \frac{ABS[X(t) - Xf(t-n)]}{DBAND}\right)$$

$$FACTORn-1 = MIN\left(1, \frac{ABS[X(t-1) - Xf(t-n)]}{DBAND}\right)$$

-continued
$$FACTORn-2 = MIN\left(1, \frac{ABS[X(t-2) - Xf(t-n)]}{DBAND}\right)$$
$$\downarrow \quad \quad \downarrow$$
$$FACTOR1 = MIN\left(1, \frac{ABS[X(t-n+1) - Xf(t-n)]}{DBAND}\right)$$

second means for calculating n f values according to the expressions:

fn=SIGN[X(t)−Xf(t−n)]*FACTORn fn−1=SIGN[X(t−1)−Xf(t−n)]*FACTORn−1

$$fn-2 = SIGN[X(t-2) - Xf(t-n)] * FACTORn-2$$
$$\downarrow \quad \downarrow \quad \quad \downarrow$$
$$f1 = SIGN[X(t-n+1) - Xf(t-n)] * FACTOR1$$

third means for calculating fsum according to the expression:

fsum=INT(ABS(f1+f2+f3+ . . . +fn))

fourth means for calculating FAC according to the expression:

FAC=(ABS(fsum)/n)$^z$ fifth means for calculating the smoothed value XS(t) according to the expression:

XS(t)=(a0)X(t)+(a1)X(t−1)+ . . . +(an−1)X(t−(n−1));

and sixth means for calculating a filtered value Xf(t) according to the expression (60):

Xf(t)=Xf(t−1)+FIL*FAC*{XS(t)−Xf(t−1), wherein:
X(t)=raw data point at time t;
Xf(t)=filtered signal at time t;
n is a positive integer;
z is a positive number; and
1=a0+a1+ . . . +an−1.

9. The numerical filter as recited in claim 8, wherein n is greater than or equal to 2.

* * * * *

UNITED STATES PATENT AND TRADEMARK OFFICE
CERTIFICATE OF CORRECTION

PATENT NO. : 6,263,355 B1
DATED : July 17, 2001
INVENTOR(S) : Douglas G. Harrell et al.

It is certified that error appears in the above-identified patent and that said Letters Patent is hereby corrected as shown below:

Column 29,
Line 2, change "fn-2=SIGN[X(t-2)-Xf(t-n)]*FACTORn-1" to -- fn-2=SIGN[X(t-2)-Xf(t-n)]*FACTORn-2 --

Column 30,
Line 66, change "fn-1=SIGN[X(t-1)-Xf(t-n)]FACTORn-1" to -- fn-1=SIGN[X(t-1)-Xf(t-n)]*FACTORn-1 --

Column 31,
Line 11, change "fsum=ABS(f+f2+f3 ... +fn)" to -- fsum=ABS(f1+f2+f3 ... +fn) --

Signed and Sealed this

Fourteenth Day of December, 2004

JON W. DUDAS
*Director of the United States Patent and Trademark Office*